United States Patent
Ikeda et al.

(10) Patent No.: US 11,501,459 B2
(45) Date of Patent: Nov. 15, 2022

(54) INFORMATION PROCESSING APPARATUS, METHOD OF INFORMATION PROCESSING, AND INFORMATION PROCESSING SYSTEM

(71) Applicant: SONY CORPORATION, Tokyo (JP)

(72) Inventors: Takuya Ikeda, Tokyo (JP); Kentaro Ida, Tokyo (JP); Yuri Kusakabe, Tokyo (JP)

(73) Assignee: SONY CORPORATION, Tokyo (JP)

( * ) Notice: Subject to any disclaimer, the term of this patent is extended or adjusted under 35 U.S.C. 154(b) by 180 days.

(21) Appl. No.: 16/765,804

(22) PCT Filed: Oct. 15, 2018

(86) PCT No.: PCT/JP2018/038249
§ 371 (c)(1),
(2) Date: May 20, 2020

(87) PCT Pub. No.: WO2019/130729
PCT Pub. Date: Jul. 4, 2019

(65) Prior Publication Data
US 2020/0320729 A1    Oct. 8, 2020

(30) Foreign Application Priority Data

Dec. 27, 2017 (JP) .............................. JP2017-250390

(51) Int. Cl.
*G06T 7/70* (2017.01)
*G06T 7/50* (2017.01)
(Continued)

(52) U.S. Cl.
CPC .............. *G06T 7/70* (2017.01); *G06F 3/0346* (2013.01); *G06F 3/042* (2013.01); *G06T 7/50* (2017.01);
(Continued)

(58) Field of Classification Search
CPC combination set(s) only.
See application file for complete search history.

(56) References Cited

U.S. PATENT DOCUMENTS

| 8,970,624 B2 * | 3/2015 | Baseley | A63F 13/42 463/31 |
| 9,063,574 B1 * | 6/2015 | Ivanchenko | G06F 1/32 |
| 2002/0135688 A1 * | 9/2002 | Niikawa | H04N 5/235 348/251 |

(Continued)

FOREIGN PATENT DOCUMENTS

| CN | 103260009 A | 8/2013 |
| CN | 104185829 A | 12/2014 |

(Continued)

OTHER PUBLICATIONS

International Search Report and Written Opinion of PCT Application No. PCT/JP2018/038249, dated Dec. 25, 2018, 07 pages of ISRWO.

(Continued)

*Primary Examiner* — Van N Chow
(74) *Attorney, Agent, or Firm* — Chip Law Group

(57) ABSTRACT

Provided is an information processing apparatus including a determination unit that determines an input state of a user based on a captured image of a first imaging device and a sensor controller that determines an imaging position at which an input image is captured by a second imaging device different from the first imaging device, based on a positional relation between an input-related object related to input by the user and each of a plurality of imaging position candidates and the input state.

18 Claims, 20 Drawing Sheets

(51) Int. Cl.
  *H04N 5/232* (2006.01)
  *G06F 3/0346* (2013.01)
  *G06F 3/042* (2006.01)
  *H04N 5/247* (2006.01)

(52) U.S. Cl.
  CPC ......... *H04N 5/23299* (2018.08); *H04N 5/247* (2013.01); *G06T 2207/30196* (2013.01); *G06T 2207/30244* (2013.01)

(56) References Cited

U.S. PATENT DOCUMENTS

| | | | | |
|---|---|---|---|---|
| 2011/0149126 | A1* | 6/2011 | Mitsui | H04N 9/04515 |
| | | | | 348/278 |
| 2015/0077331 | A1 | 3/2015 | Kasahara et al. | |
| 2016/0171675 | A1* | 6/2016 | Tseng | G06F 3/0383 |
| | | | | 345/8 |
| 2018/0108149 | A1* | 4/2018 | Levinshtein | G02B 27/0172 |
| 2020/0133388 | A1* | 4/2020 | Takemoto | G06V 40/107 |

FOREIGN PATENT DOCUMENTS

| | | |
|---|---|---|
| CN | 104735416 A | 6/2015 |
| EP | 2831701 A1 | 2/2015 |
| JP | 11-250364 A | 9/1999 |
| JP | 2002-259989 A | 9/2002 |
| JP | 2013-168757 A | 8/2013 |
| JP | 2013-205896 A | 10/2013 |
| JP | 2017-084307 A | 5/2017 |
| KR | 10-2015-0009955 A | 1/2015 |
| WO | 2013/145572 A1 | 10/2013 |

OTHER PUBLICATIONS

Office Action for CN Patent Application No. 201880075750.1, dated Jul. 13, 2021, 09 pages of English Translation and 07 pages of Office Action.

Extended European Search Report of EP Application No. 18893651.2, dated Jan. 13, 2021, 11 pages.

* cited by examiner

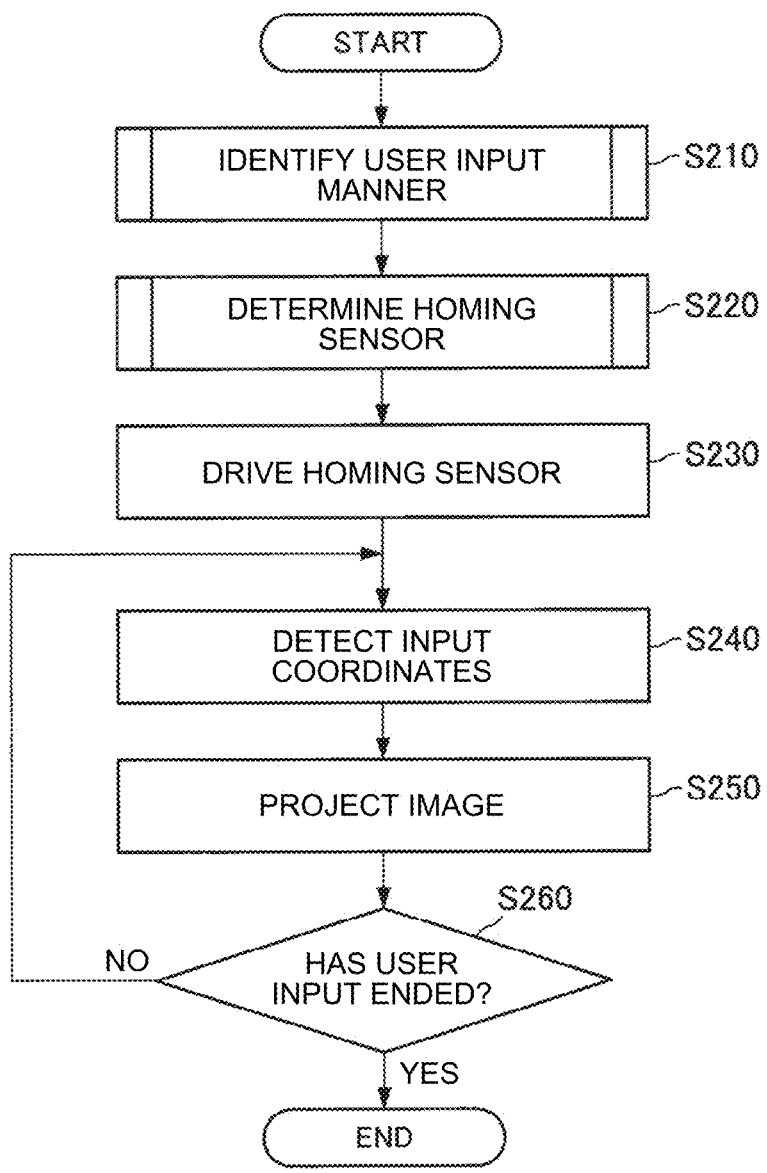

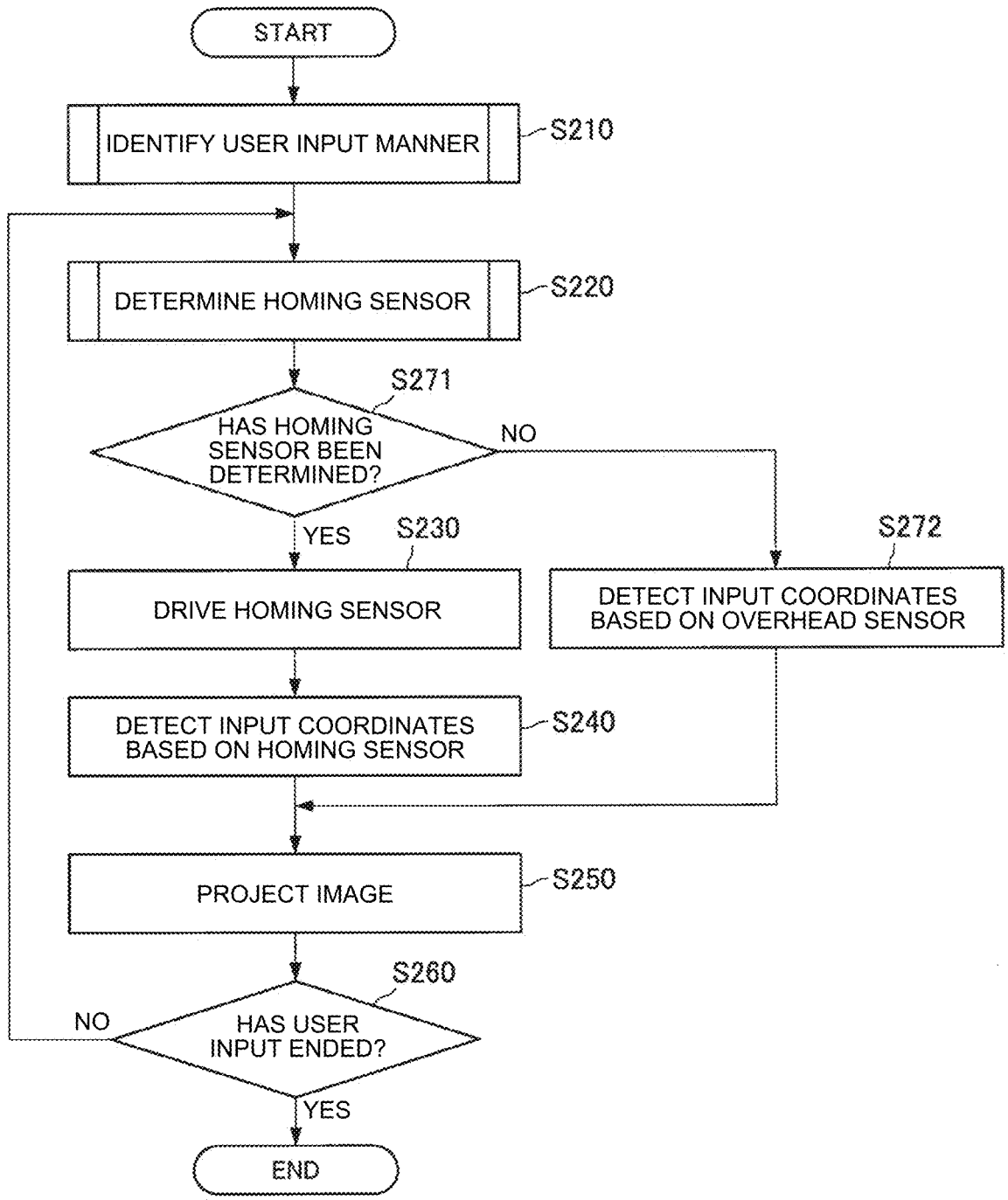

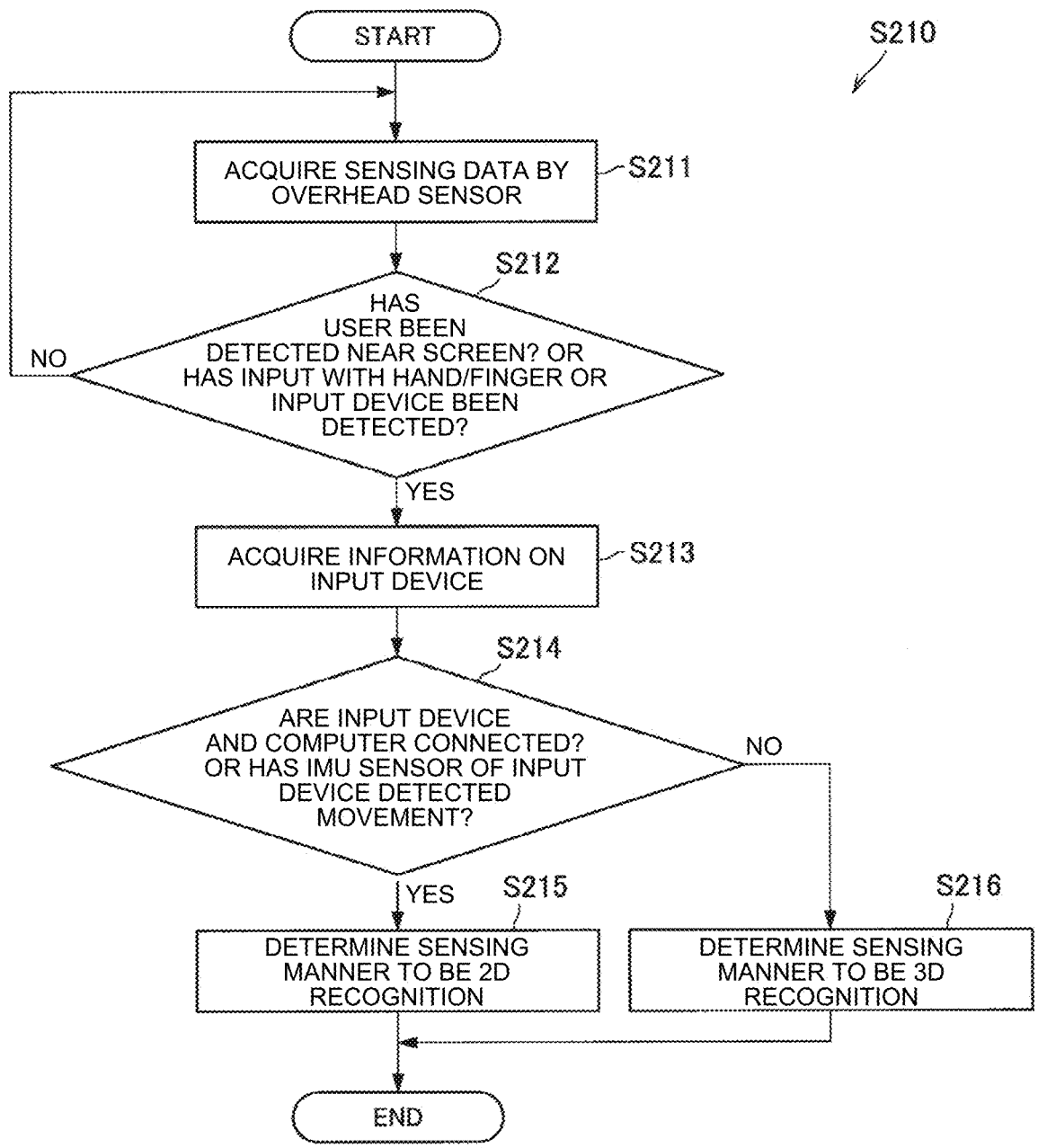

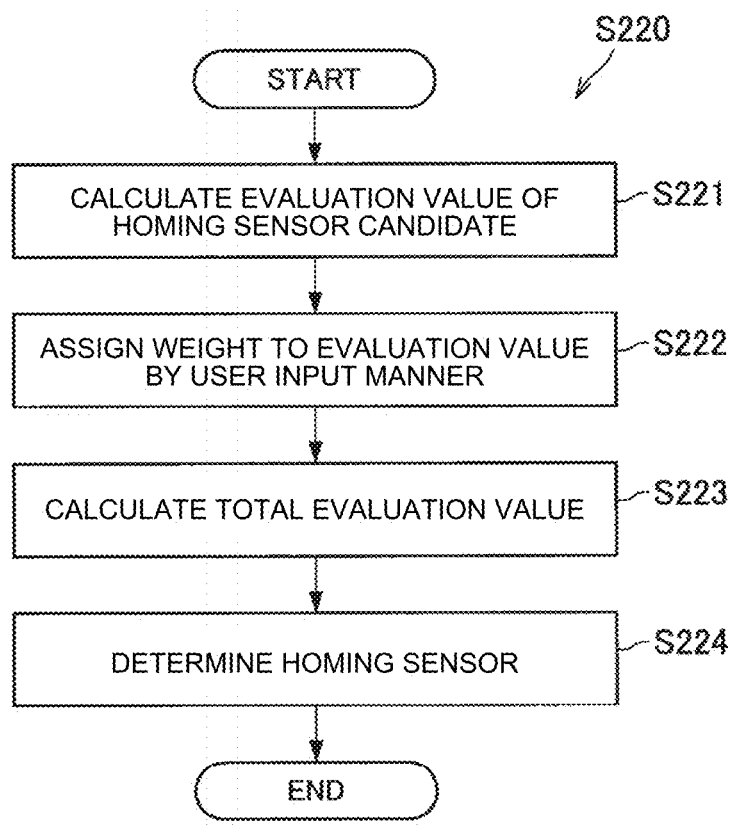

FIG.11

| | MAJOR EVALUATION ITEM | MINOR EVALUATION ITEM | EVALUATION VALUE RANGE | WEIGHT COEFFICIENT IN 2D RECOGNITION | WEIGHT COEFFICIENT IN 3D RECOGNITION |
|---|---|---|---|---|---|
| NUMERICAL EVALUATION | HOMING SENSOR | DISTANCE TO SCREEN (Dist) | 0 TO 1 | 1 | 2 |
| | | SENSING RESOLUTION TO SCREEN (resolution) | 0 TO 1 | 1 | 1 |
| | | SENSING DISTANCE RESOLUTION TO SCREEN (DepthResolution) | 0 TO 1 | 0 | 2 |
| | | ANGLE BETWEEN SCREEN AND SENSOR (Angle) | 0 TO 1 | 1 | 1.5 |
| | | SENSOR DRIVE ANGLE TO SCREEN (MoveAngle) | 0 TO 1 | 0.5 | 0.5 |
| | HOMING SENSOR | SHIELDED AREA BY OBSTACLE | | | |
| | | SHIELDED AREA BY USER | 0 TO 1 | 1 | 1 |
| | | AREA PREDICTED NOT TO BE USED | | | |
| | EXTERNAL LIGHT | DETECTABLE AREA WITH EXTERNAL LIGHT TAKEN INTO CONSIDERATION | 0 TO 1 | 1 | 1 |

INFORMATION PROCESSING APPARATUS, METHOD OF INFORMATION PROCESSING, AND INFORMATION PROCESSING SYSTEM

CROSS REFERENCE TO RELATED APPLICATIONS

This application is a U.S. National Phase of International Patent Application No. PCT/JP2018/038249 filed on Oct. 15, 2018, which claims priority benefit of Japanese Patent Application No. JP 2017-250390 filed in the Japan Patent Office on Dec. 27, 2017. Each of the above-referenced applications is hereby incorporated herein by reference in its entirety.

FIELD

The present disclosure relates to an information processing apparatus, a method of information processing, and an information processing system.

BACKGROUND

In recent years, a technique of collecting information on an object to be monitored through images has been disclosed. For example, disclosed is a technique of detecting positional information of an object to be monitored based on an image from an overhead camera that images an area to be monitored, detecting event information representing characteristics of the object to be monitored from an image of a gazing camera that gazes an area narrower than the area imaged by the overhead camera to image it, obtains tracking information from the positional information and the event information, and switches objects to be monitored by the gazing camera using the positional information, the event information, and the tracking information (refer to Patent Literature 1, for example).

CITATION LIST

Patent Literature

Patent Literature 1: JP 2013-168757 A

SUMMARY

Technical Problem

However, input by a user may be performed. In such a case, an object related to the input by the user can be the object to be monitored. In this process, a technique by which the object related to the input is sensed with higher accuracy is desired to be provided.

Solution to Problem

According to the present disclosure, an information processing apparatus is provided that includes: a determination unit that determines an input state of a user based on a captured image of a first imaging device; and a sensor controller that determines an imaging position at which an input image is captured by a second imaging device different from the first imaging device, based on a positional relation between an input-related object related to input by the user and each of a plurality of imaging position candidates and the input state.

According to the present disclosure, a method of information processing is provided that includes: determining an input state of a user based on a captured image of a first imaging device; and determining, by a processor, an imaging position at which an input image is captured by a second imaging device different from the first imaging device, based on a positional relation between an input-related object related to input by the user and each of a plurality of imaging position candidates and the input state.

According to the present disclosure, an information processing system is provided that includes: a first imaging device; and an information processing apparatus, wherein the first imaging device captures a captured image, and the information processing apparatus includes: a determination unit that determines an input state of a user based on the captured image; and a sensor controller that determines an imaging position at which an input image is captured by a second imaging device different from the first imaging device, based on a positional relation between an input-related object related to input by the user and each of a plurality of imaging position candidates and the input state.

Advantageous Effects of Invention

As described in the foregoing, the present disclosure provides a technique by which an object related to input is sensed with higher accuracy. The above effect is not necessarily restrictive; together with the above effect or in place of the above effect, any effects shown in the present specification or other effects that can be grasped from the present specification may be produced.

BRIEF DESCRIPTION OF DRAWINGS

FIG. 6 is a flowchart of basic processing by the information processing system according to the embodiment of the present disclosure.

FIG. 7 is a flowchart of a modification of the basic processing by the information processing system according to the embodiment of the present disclosure.

FIG. 8 is a flowchart of exemplary processing identifying an input manner by a user.

FIG. 9 is a diagram of exemplary data indicating a use status of an input device.

FIG. 10 is a flowchart of exemplary processing determining the homing sensor.

FIG. 11 is a diagram of an exemplary evaluation value range and exemplary weight coefficients for each evaluation item.

DESCRIPTION OF EMBODIMENTS

The following describes a preferred embodiment of the present disclosure in detail with reference to the accompanying drawings. In the present specification and the drawings, components having substantially the same functional configuration are denoted by the same symbol to omit a duplicate description.

In the present specification and the drawings, a plurality of components having substantially the same functional configuration may be distinguished from each other by being denoted by different figures after the same symbol. Note that when there is no need to particularly distinguish the components having substantially the same functional configuration, they are denoted only by the same symbol. A plurality of components having the same or similar functional configuration may be distinguished from each other by being denoted by different letters after the same symbol. Note that when there is no need to particularly distinguish the components having the same or similar functional configuration, they are denoted only by the same symbol.

The description will be given in the following order:
0. Outline
1. Details of Embodiment
1.1. Exemplary System Configuration
1.2. Basic Processing Procedure
   1.2.1. Identification of Input Manner
   1.2.2. Determination of Homing Sensor
   1.2.3. Drive of Homing Sensor
   1.2.4. Detection of Input Coordinates
   1.2.5. End of User Input
1.3. Exemplary Development Examples
1.4. Exemplary Hardware Configuration
2. Conclusion

0. OUTLINE

In recent years, with the progress of miniaturization of projectors, projectors have been carried into conference rooms or personal rooms to be used in many cases. Recent studies propose an interactive method for utilizing projectors in which a user operates a user interface (UI) projected by a projector. In these studies, sensing for input with an operator (a hand or a finger, for example) to any place in an indoor environment can be performed. In such a use case, sensing accuracy can have a large effect on input experience of the user. Given these circumstances, an information processing system according to an embodiment of the present disclosure can improve sensing accuracy for input by the user in such a use case.

Figure 1:
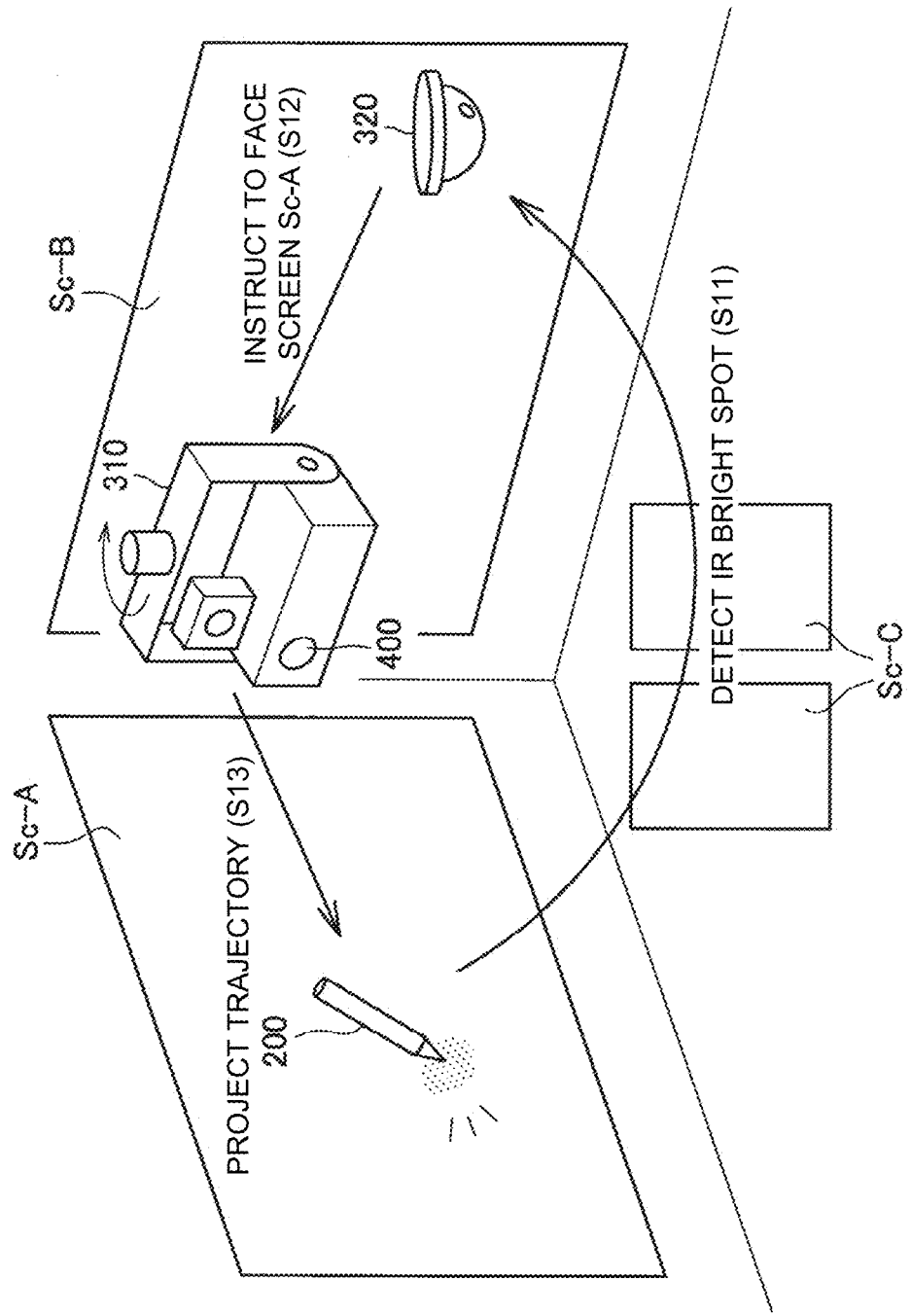
FIG. 1 is a diagram for illustrating an exemplary basic operation of an information processing system according to an embodiment of the present disclosure.

FIG. 1 is a diagram for illustrating an exemplary basic operation of the information processing system according to the embodiment of the present disclosure. Referring to FIG. 1, a plurality of screens Sc (a screen Sc-A, a screen Sc-B, and a screen Sc-C) are illustrated. Images are assumed to be projected from a projector 420 onto these screens Sc. However, when another display device is used in place of the projector 420, another display surface may be used in place of the screens Sc.

The example illustrated in FIG. 1 illustrates a case in which wall surfaces and a floor surface are used as the screens Sc. However, a display surface other than the wall surfaces and the floor surface may be used as the screens Sc. For example, the display surface may be a table surface as described below or a general object registered in advance. The display surface may be a plane surface or a curved surface. The screen Sc is an exemplary pointing surface indicated by the operator. Pointing may be able to be made through contact of the operator with the screen Sc or through non-contact of the operator with the screen Sc.

FIG. 1 illustrates an input device 200 as an exemplary operator. FIG. 1 in particular illustrates a case in which a pen type input device is used as an exemplary input device 200. However, as the input device 200, another input device may be used in place of the pen type input device. As the operator, another operator (a hand or finger of the user, for example) other than the input device 200 may be used in place of the input device 200. The embodiment of the present disclosure mainly assumes a case in which the hand or finger of the user (hereinafter, may be referred to as a "hand/finger" of the user) or the input device 200 is used as the operator.

Referring to FIG. 1, an overhead sensor 320 and a homing sensor 310 are provided. As illustrated in FIG. 1, the homing sensor 310 is rotatable. The embodiment of the present disclosure mainly assumes a case in which an output device 400 is integral with the homing sensor 310. However, the output device 400 may be a separate body from the homing sensor 310.

Figure 2:
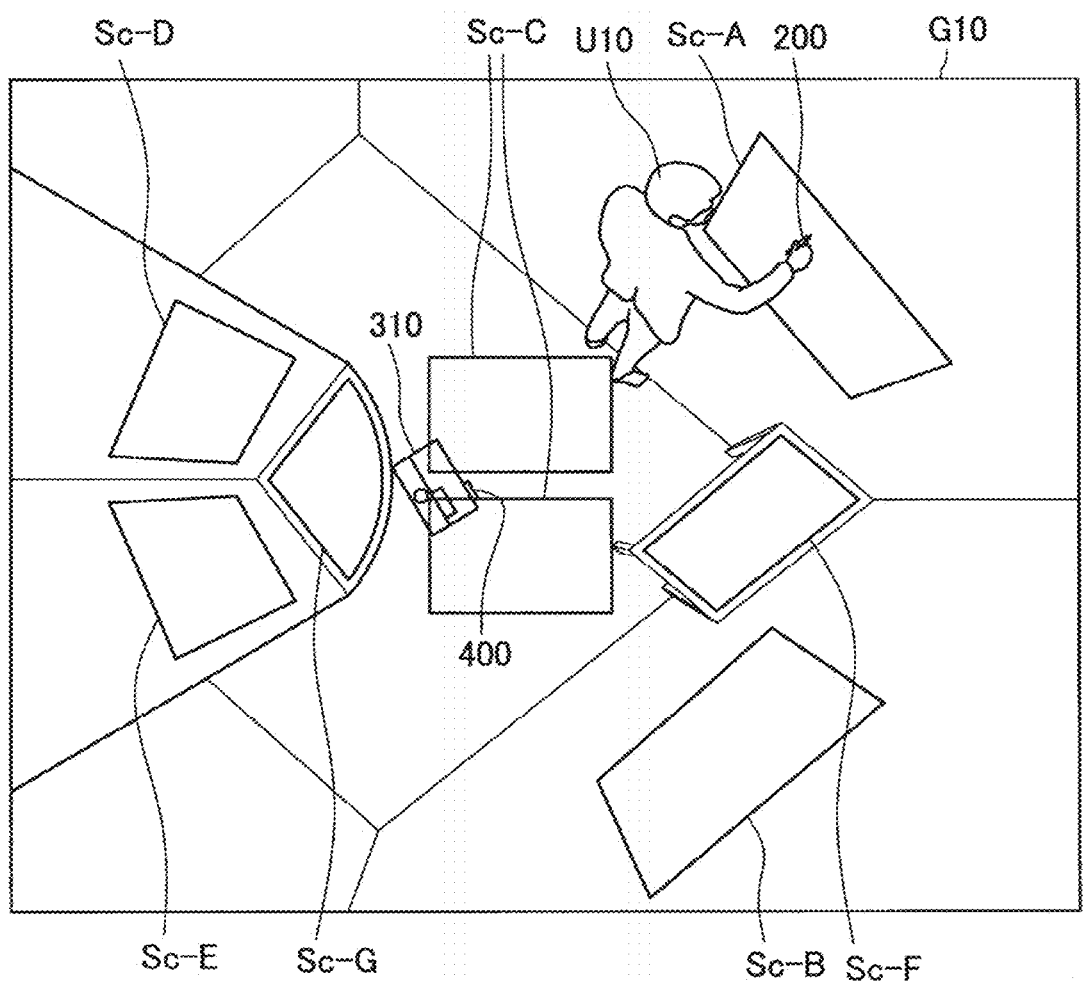
FIG. 2 is a diagram of an exemplary captured image captured by an overhead sensor.

FIG. 2 is a diagram of an exemplary captured image captured by the overhead sensor 320. Referring to FIG. 2, illustrated is an overhead sensor image G10 as an exemplary captured image captured by the overhead sensor 320. The overhead sensor image G10 is captured such that in an assumed environment (an indoor environment, for example) an overhead view of the entire environment including the wall surfaces and the floor surface is captured. Referring to FIG. 2, the wall surfaces are used for the screen Sc-A, the screen Sc-B, a screen Sc-D, and a screen Sc-E, the floor surface is used for the screen Sc-C and a screen Sc-G, and the table surface is used for a screen Sc-F. Although the screens Sc are present spaced apart from each other in the example illustrated in FIG. 2, the screens Sc may be continuous with each other.

Figure 3:
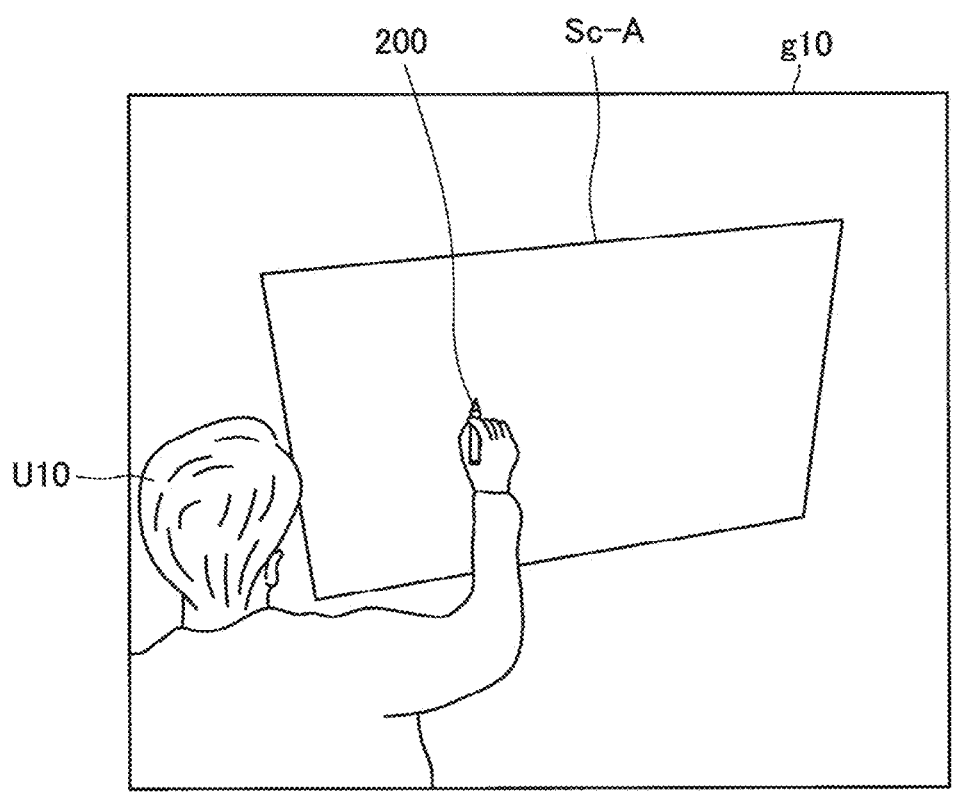
FIG. 3 is a diagram of an exemplary input image captured by a homing sensor.

FIG. 3 is a diagram of an exemplary input image captured by the homing sensor 330. Referring to FIG. 3, illustrated is a homing sensor image g10 as the exemplary input image captured by the homing sensor 310. Referring to FIG. 3, the homing sensor image g10 shows the screen Sc-A and the input device 200 over a wider area than the overhead sensor image G10 illustrated in FIG. 2. That is to say, the view angle of the homing sensor 310 is narrower than the view angle of the overhead sensor 320. Alternatively, the resolution of the homing sensor 310 may be higher than the resolution of the overhead sensor 320.

Thus, the overhead sensor 320 is suitable for providing a captured image for determining to which screen Sc pointing is performed (or pointing is about to be performed) with the input device 200. On the other hand, the homing sensor 310 is suitable for providing an input image for detecting the pointing coordinates of the input device 200 with high accuracy by imaging the screen Sc (the screen Sc-A in the example illustrated in FIG. 1) to which pointing is performed (or pointing is about to be performed) with the input device 200.

The example illustrated in FIG. 1 includes one overhead sensor 320 and one homing sensor 310. However, as described below, a plurality of overhead sensors 320 or a plurality of homing sensors 310 may be included. The overhead sensor 320 is only an exemplary first imaging device capturing the captured image, and thus another imaging device may be used in place of the overhead sensor 320. Similarly, the homing sensor 310 is only an exemplary second imaging device capturing the input image, and thus another imaging device may be used in place of the homing sensor 310.

The input device 200 is configured such that when its tip touches the screen Sc (the screen Sc-A in the example illustrated in FIG. 1) by the user, a switch of the input device 200 is pressed by pressure that the tip receives from the screen Sc, whereby an infrared light emitting diode (IR LED) emits IR. Given this, when an IR bright spot emitted by the input device 200 is detected by the overhead sensor 320 (S11), based on the position of the IR bright spot, the fact that pointing is performed (or pointing is about to be performed) to the screen Sc-A with the input device 200 is detected, and an instruction to face the screen Sc-A is issued to the homing sensor 310 (S12).

The homing sensor 310 faces the screen Sc-A in accordance with the instruction and detects the IR bright spot emitted by the input device 200 to detect the pointing coordinates of the input device 200 with high accuracy. Upon detection of the pointing coordinates with high accuracy, the projector 420 projects a trajectory of the tip onto the pointing coordinates (S13). The trajectory projected by the projector 420 is only an exemplary first image projected by the projector 420, and thus another image other than the trajectory may be projected by the projector 420.

As described in the foregoing, the basic operation of the information processing system according to the embodiment of the present disclosure can improve sensing accuracy for the input by the user.

1. DETAILS OF EMBODIMENT

[1.1. Exemplary System Configuration]

Figure 4:
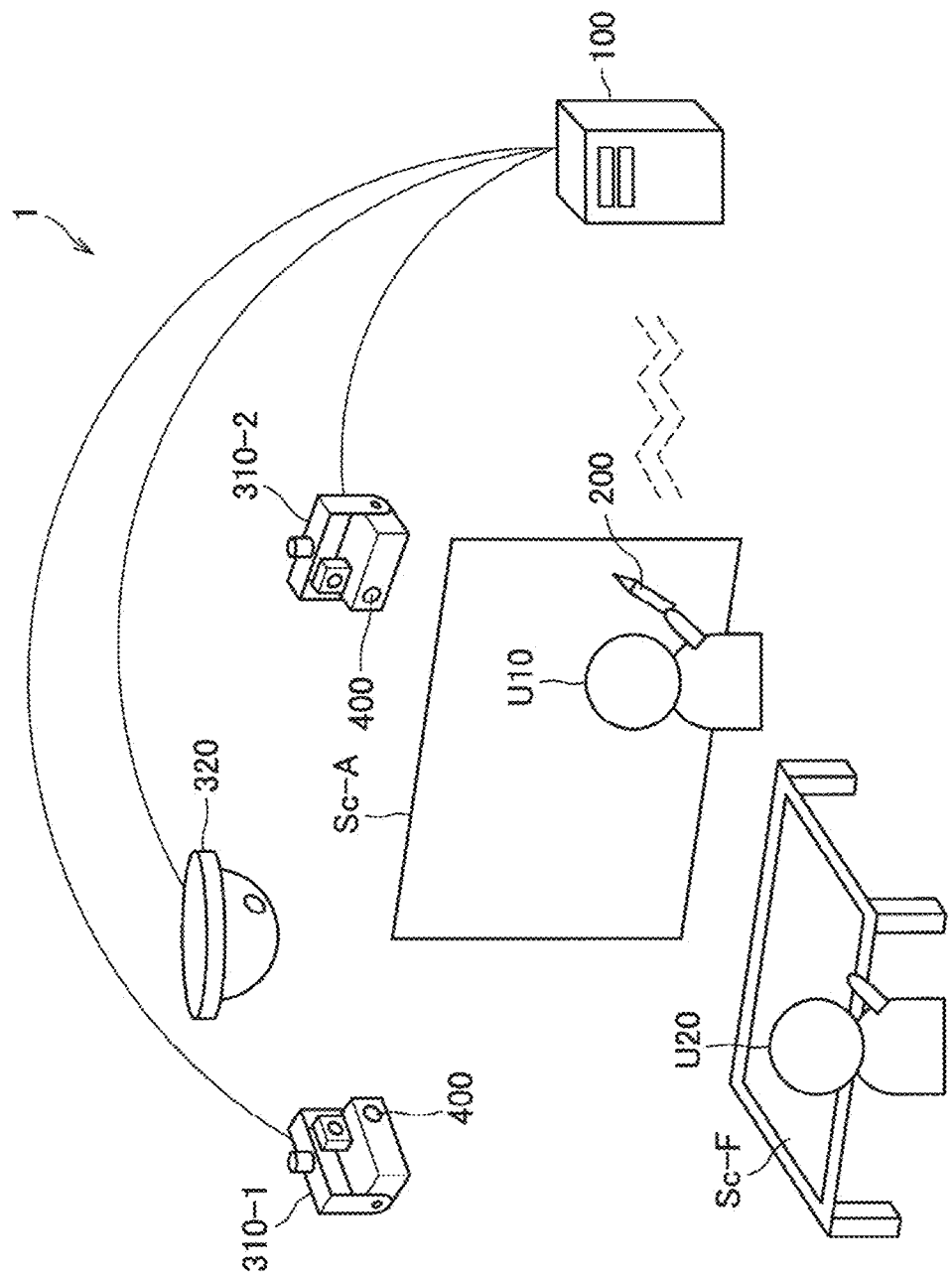
FIG. 4 is a schematic configuration diagram of the information processing system according to the embodiment of the present disclosure.

Subsequently, the following describes an exemplary configuration of an information processing system 1 according to the embodiment of the present disclosure with reference to FIG. 4 and FIG. 5. FIG. 4 is a schematic configuration diagram of the information processing system 1 according to the embodiment of the present disclosure. As illustrated in FIG. 4, the information processing system 1 includes an information processing apparatus 100, the input device 200, homing sensors 310-1 and 310-2, and the overhead sensor 320.

The homing sensors 310-1 and 310-2 are each integral with the projector 420. The number of the homing sensors 310 is not limited and may be one or more. In the example illustrated in FIG. 4, a user U10 is about to perform pointing on the screen Sc-A using the input device 200 as an exemplary operator. On the other hand, a user U20 is about to perform pointing using the screen Sc-F using a finger as an exemplary operator.

For example, the information processing apparatus 100 selects the homing sensor 310 enabling high-accuracy sensing for input by the user U10 based on the captured image by the overhead sensor 320. The information processing apparatus 100 then starts sensing for the input by the user U10 by the selected homing sensor 310. In this process, the homing sensor 310 may be rotatable until sensing for the input by the user U10 is enabled. Sensing for input through the screen Sc-F may similarly be started.

Figure 5:
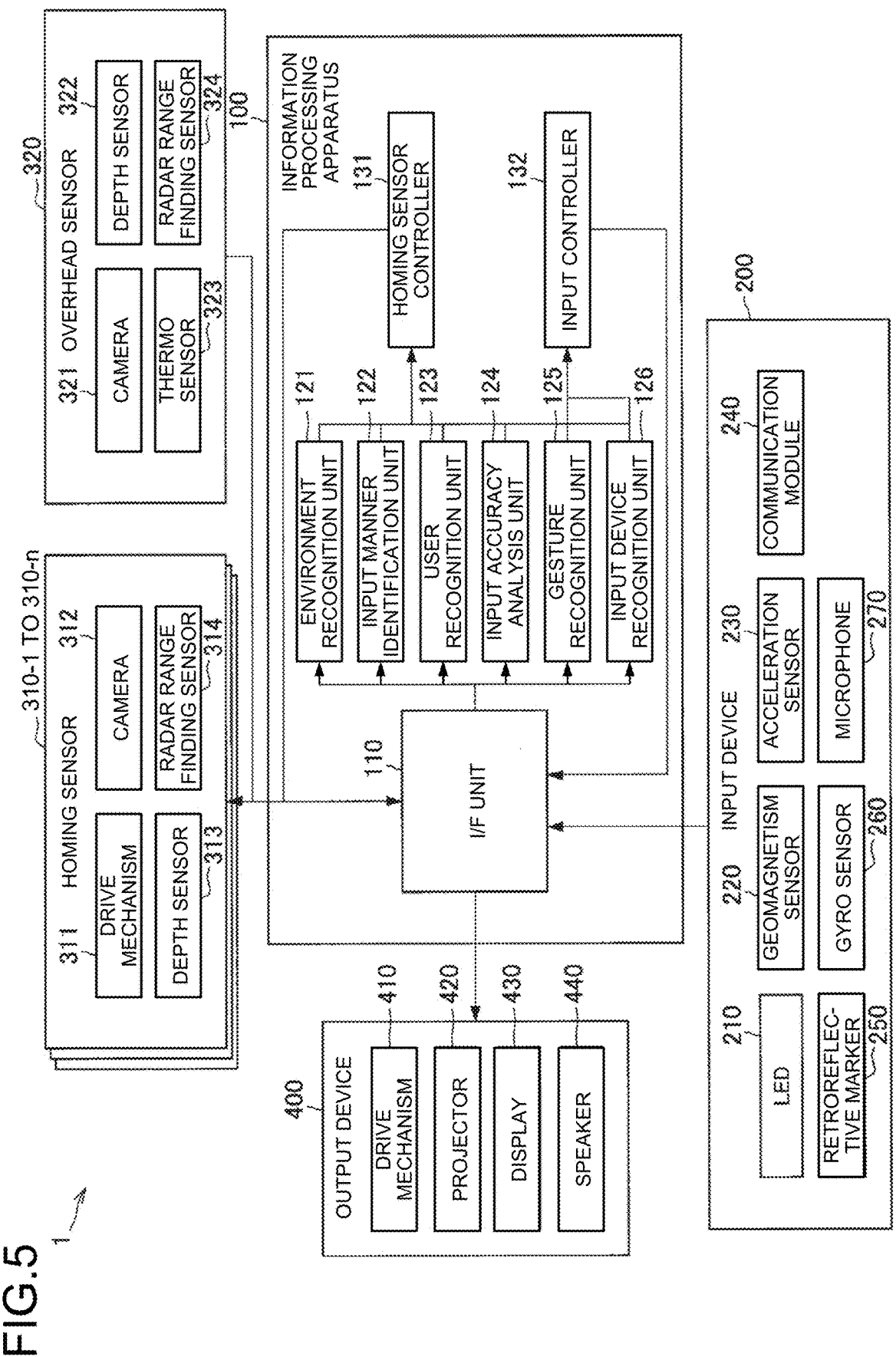
FIG. 5 is a diagram of an exemplary functional configuration of the information processing system according to the embodiment of the present disclosure.

FIG. 5 is a diagram of an exemplary functional configuration of the information processing system 1 according to the embodiment of the present disclosure. As illustrated in FIG. 1, the information processing system 1 includes the information processing apparatus 100, the input device 200, homing sensors 310-1 to 310-$n$ ($n$ is a natural number), the overhead sensor 320, and the output device 400.

The information processing apparatus 100 includes an I/F unit 110. The information processing apparatus 100 has an environment recognition unit 121, an input manner identification unit 122, a user recognition unit 123, an input accuracy analysis unit 124, a gesture recognition unit 125, an input device recognition unit 126, and controllers such as a homing sensor controller 131 and an input controller 132.

Among them, the user recognition unit 123 and the input accuracy analysis unit 124 can function as a determination unit that determines an input state of a user based on the captured image of the overhead sensor 320. The homing sensor controller 131 can function as a sensor controller that determines an imaging position at which an input image is captured by the homing sensor 310, which is different from the overhead sensor 320, based on a positional relation between an input-related object related to input by the user and each of a plurality of imaging position candidates and the input state. The input controller 132 has the function of performing processing related to the input image. With this configuration, the object related to input can be sensed with higher accuracy.

The following mainly assumes a case in which the input-related object is a screen (a pointing surface). However, the input-related object may be an operator. That is to say, the input-related object may include at least either the operator or the screen (the pointing surface). As described below, the input state may include at least either a state in which the operator indicates the screen (the pointing surface) or a state in which the distance between the user and the screen (the pointing surface) is shorter than a certain distance. In the following, the description will be given mainly using these two states as exemplary input states.

The following mainly assumes a case in which the homing sensor 310 is provided at each of the imaging position candidates in advance. In this case, based on a positional relation between the input-related object and the homing sensor 310 (an imaging device candidate) provided at each of the imaging position candidates and the input state, the homing sensor controller 131 selects the homing sensor 310 capturing the input image from homing sensors 310 (imaging device candidates). With this operation, the homing sensor controller 131 determines a position at which the homing sensor 310 capturing the input image is provided to be the imaging position.

The controller may be configured by a processor such as a central processing unit (CPU), for example. When the controller is configured by the processor such as a CPU, the processor may be configured by an electronic circuit.

The overhead sensor 320 performs imaging so as to capture an overhead view of the entire environment. The embodiment of the present disclosure mainly assumes a case in which as the overhead sensor 320, a camera 321 observing infrared light (cutting off visible light) and a depth sensor 322 are used. However, the camera 321 may include a visible-light camera. As the overhead sensor 320, a thermo sensor 323, a radar range finding sensor 324 sensing a wide field of view, or the like may be used. The overhead sensor 320 may include a mode of performing zooming or changing an aperture.

The captured image (sending information) by the overhead sensor 320 is sent to the environment recognition unit 121, the input manner identification unit 122, the user recognition unit 123, and the input accuracy analysis unit 124 via the I/F unit 110 of the information processing apparatus 100.

The environment recognition unit 121 recognizes a three-dimensional shape of the environment or a three-dimensional position of the screen based on the captured image by the overhead sensor 320. The input manner identification unit 122 identifies whether an input manner by the user is an input manner with a finger (or a hand) (a hand input manner) or an input manner with an input device.

The user recognition unit 123 recognizes a three-dimensional position of the user based on the captured image by the overhead sensor 320.

The input accuracy analysis unit 124 recognizes the pointing coordinates on the screen, the position of the user, and the like and determines whether the user is performing pointing (or whether the user is about to perform pointing) on the screen. These pieces of information are sent to the homing sensor controller 131, and the homing sensor controller 131 determines the homing sensor 310 suitable for sensing for the input by the user based on these pieces of information.

The homing sensor 310 senses the input by the user by the overhead sensor 320 with high accuracy. The homing sensor 310 has a drive mechanism 311 so as to enable any direction to be sensed. The drive mechanism 311 may be a two-axis drive mechanism, for example. Thus, the embodiment of the present disclosure mainly assumes a case in which the homing sensor 310 is rotatable (the homing sensor 310 can change in orientation). However, the homing sensor 310 may be not only rotatable but also movable (the homing sensor 310 can change in position).

The embodiment of the present disclosure mainly assumes a case in which as the homing sensor 310, a camera 312 observing infrared light (cutting off visible light) and a depth sensor 313 are used. However, the camera 312 may include a visible-light camera. As the homing sensor 310, a thermo sensor, a radar range finding sensor 314 that can sense the operator, or the like may be used. The homing sensor 310 may include a mode of performing zooming or changing an aperture.

The input image (sensing information) captured by the homing sensor 310 is sent to the gesture recognition unit 125 and the input device recognition unit via the I/F unit 110 of the information processing apparatus 100. When the user is performing input with the hand/finger, the gesture recognition unit 125 recognizes a three-dimensional position of the hand/finger of the user and a three-dimensional position of the screen based on the input image captured by the homing sensor 310 and sends these positions as input information to the input controller 132. When the user is performing input with the input device, the input device recognition unit 126 recognizes a two-dimensional position of the input device and a two-dimensional position of the screen from the input image captured by the homing sensor 310 and sends these pieces of information as the input information to the input controller 132.

The input device 200 is a device used for the input by the user. As described above, the embodiment of the present disclosure mainly assumes a case in which a pen type device with an LED 210 (an IR LED) installed in the tip thereof is used. The input device 200 has a mechanism causing the LED 210 to emit light when being pressed against the screen by the user, for example. An emission position (a bright spot) by the LED 210 is detected by the overhead sensor 320 and the homing sensor 310 and is sent to the information processing apparatus 100.

A retroreflective marker 250 may be added to the input device 200. In that case, a marker position is detected by a device having a projector and a camera, and the marker position is sent as the input information to the input controller 132. The input device 200 may be a device using directional light such as a laser pointer. In such a case, input is not performed like writing with a pen, but input is performed by pointing from a position remote from the screen.

As the input device 200, a portable terminal such as a smartphone or wristband type or glasses type wearable device may be used. For example, when the position of any of these devices is recognized from the shape of the device, and when a connection state with a computer is recognized, the position of the device, the connection state with the computer, and the like are processed in a combined manner, whereby the device can be used as the input device.

Using a combination of a gyro sensor 260, an acceleration sensor 230, a geomagnetism sensor 220, and the like (an inertial measurement unit (IMU)), self-position estimation of the input device 200 may be performed. In this process, when the homing sensor 310 can directly detect the position of the input device 200, the homing sensor 310 may detect an absolute position of the input device 200.

On the other hand, when the homing sensor 310 cannot directly detect the position of the input device 200, the absolute position of the input device 200 may be detected by a relative position based on an IMU sensor based on an absolute position detected in the past. With this operation, even when the homing sensor 310 does not detect the input device 200 caused by shielding by the user or an obstacle, the position (a two-dimensional position or a three-dimensional position) of the input device 200 can be acquired.

The input device 200 includes a communication module 240. The input device 200 sends communication information and/or movement information by the IMU to the input manner identification unit 122 of the information processing apparatus 100 by the communication module 240. The communication information may be an ID used for wireless communication (an ID of Bluetooth (registered trademark) or an ID of Wi-Fi (registered trademark), for example). Based on the communication information and/or the movement information and the captured image by the overhead sensor 320, the input manner of the user is identified.

The information processing apparatus 100 receives information from the sensors and the input device 200, performs processing by the units, and then sends information to the homing sensor 310 by the homing sensor controller 131 and sends information to output device 400 by the input controller 132. After determining a suitable homing sensor 310, the homing sensor controller 131 drives the homing sensor 310 to the position of the screen and starts sensing by the homing sensor 310. The input controller 132 detects input coordinates (the pointing coordinates), generates an image based on the input coordinates, and sends the image to the output device 400.

The output device 400 is an apparatus that can present an image at any place. The embodiment of the present disclosure mainly assumes a case in which the projector 420 that has a drive mechanism 410 and can project an image onto any place at which the user is performing input is used. The embodiment of the present disclosure assumes a case in which the projector 420 is installed concentrically with the homing sensor 310.

However, the homing sensor 310 and the projector 420 are not necessarily concentrically arranged. Note that a positional relation between the homing sensor 310 and the projector 420 is required to be known. The drive mechanism 410 may have a mechanism that not only changes the orientation of the projector 420 but also can move the projector 420. The output device 400 may display the input information on a display 430.

The output device 400 may have a projector that can omnidirectionally project an image or have a full screen display (an environment like the one filled with a full screen display may be provided). Any object with a three-dimensional shape registered in advance may be used as the screen. In such a case, in like manner with the case in which the two-dimensional position or the three-dimensional position of the screen is recognized as described above, the position of the object with a three-dimensional shape is recognized, whereby sensing by the homing sensor 310 can be performed based on the position of the object with a three-dimensional shape.

Thus, the exemplary configuration of the information processing system 1 according to the embodiment of the present disclosure has been described.

[1.2. Basic Processing Procedure]

Subsequently, the following describes a basic processing procedure by the information processing system 1 according to the embodiment of the present disclosure.

FIG. 6 is a flowchart of the basic processing procedure by the information processing system 1 according to the embodiment of the present disclosure. First, the input manner identification unit 122 identifies an input manner by the user using information obtained from the overhead sensor 320 and information from an input device (S210). In the embodiment of the present disclosure, the input manner identification unit 122 identifies whether the input manner by the user is an input manner with the input device or an input manner with the hand/finger of the user. With this operation, 2D recognition is determined as a sensing manner for the input manner with the input device, whereas 3D recognition is determined as a sensing manner for the input manner with the hand/finger of the user.

How the sensing manner is determined is not limited to a particular manner. For example, when there is no parallax of the operator against the screen in a captured image of each of a plurality of cameras, the operator is assumed to be in contact with the screen, and thus the 2D recognition may be used as the sensing manner. On the other hand, when there is parallax of the operator against the screen in the captured image of each of the cameras, the operator is assumed not to be in contact with the screen, and thus the 3D recognition may be used as the sensing manner.

There is difference between the 2D recognition and the 3D recognition shown below. That is to say, in the 2D recognition, the two-dimensional pointing coordinates of the input device are detected from an image, and coordinate transformation from the detected two-dimensional pointing coordinates to two-dimensional screen coordinates is performed. On the other hand, in the 3D recognition, the three-dimensional position of the screen and the three-dimensional position of the hand/finger are calculated from depth information, and based thereon, a three-dimensional contact position of a fingertip against the screen is detected, and coordinate transformation from the three-dimensional contact position to two-dimensional screen coordinates is performed.

Next, the homing sensor controller 131 determines the homing sensor 310 sensing the input by the user (S220). In this process, the homing sensor controller 131 calculates evaluation values for each of a plurality of respective homing sensors 310 based on the user input manner determined at S210, the position of the user, and a positional relation between the screen (or the operator) and the homing sensor 310 and determines the homing sensor 310 based on the evaluation values.

Subsequently, the input controller 132 drives the determined homing sensor 310 so as to sense the screen (S230). The input controller 132 starts processing related to the input image of the homing sensor 310 upon detection of indication of the screen (the pointing surface) with the operator. With this operation, the input by the user is sensed with high resolution.

Upon sensing of the input by the user by the homing sensor 310, the input controller 132 detects the input coordinates (the pointing coordinates) from the image obtained by the sensing (S240), transforms the input coordinates (the pointing coordinates) into the screen coordinates, and projects an image based on the screen coordinates (S250). Subsequently, when user input has not been ended (No at S260), the operation shifts to S240; when the user input has been ended (Yes at S260), the operation ends.

FIG. 7 is a flowchart of a modification of the basic processing by the information processing system 1 according to the embodiment of the present disclosure. In the modification, in like manner with the example illustrated in FIG. 6, the user input manner is also identified (S210). Next, the homing sensor controller 131 attempts to determine the homing sensor 310 sensing the input by the user (S220). In this process, the homing sensor controller 131 calculates an evaluation value for each of the homing sensors 310 based on a use status of the homing sensor 310, the user input manner determined at S210, the position of the user, and the positional relation between the screen (or the operator) and the homing sensor 310 and determines the homing sensor 310 based on the evaluation values.

The input controller 132 determines whether the homing sensor has been determined (S271). If an available homing sensor 310 is present (Yes at S271), the input controller 132 shifts the operation to S230 in like manner with the example illustrated in FIG. 6. On the other hand, if no available homing sensor 310 is present (No at S271), the input controller 132 detects the input coordinates (the pointing coordinates) based on the overhead sensor 320 (S272) and projects an image based on the input coordinates (the pointing coordinates) (S250). If the user input has not been ended (No at S260), the operation shifts to S220. The input controller 132 performs evaluation about whether an available homing sensor 310 is present at all times also while input is being performed by the user (S220) and, if an available homing sensor 310 is present (Yes at S271), drives the homing sensor 310 to the screen pointed by the user at a possible time (S230). On the other hand, if the user input has been ended (Yes at S260), the operation ends.

The following describes "Identification of Input Manner," "Determination of Homing Sensor," "Drive of Homing Sensor," "Detection of Input Coordinates," and "End of User Input" in detail.

(1.2.1 Identification of Input Manner)

The following first describes identification of the input manner by the user (S210). FIG. 8 is a flowchart of exemplary processing identifying the input manner by the user. As illustrated in FIG. 8, the input manner identification unit 122 acquires sensing data by the overhead sensor 320 (S211) and determines whether the user has approached the screen based on the sensing data. Next, the input manner identification unit 122 identifies the input manner by the user. That is to say, the input manner identification unit 122 determines whether the input manner by the user is an input manner by the 2D recognition or an input manner by the 3D recognition.

More specifically, the depth sensor 322 observes a use environment in a wide field and senses a positional relation between the screen (an indoor wall surface, object, or the like) and the user. The input manner identification unit 122 determines whether the user has been detected near the screen (whether the user has approached the screen) depending on whether the distance between the screen and the user has become smaller than a threshold (S212). The fact that the distance between the screen and the user has become smaller than the threshold can be determined as an input state of the user by the input manner identification unit 122. Alternatively, the input manner identification unit 122 determines whether input with the hand/finger or the input device 200 has been detected based on the sensing data by the overhead sensor 320 (S212). The fact that the input with the hand/finger or the input device 200 has been detected can be determined as the input state of the user by the input manner identification unit 122.

For example, the input with the hand/finger can be determined depending on whether the hand/finger has come into contact with the screen based on a positional relation between the screen and the hand/finger of the user. The input with the input device 200, when the input device 200 is a pen type input device, can be determined depending on whether the IR bright spot has been detected from the sensing data by the overhead sensor 320.

Subsequently, the input manner identification unit 122 identifies the input manner by the user. First, the input manner identification unit 122 checks a network connection status between the input device 200 and the computer. If the input device 200 and the computer are network-connected (Yes at S214), the input manner identification unit 122 determines that the user is about to perform input using the input device 200 and determines the sensing manner to be the 2D recognition (S215).

On the other hand, if the input device 200 and the computer are not network-connected (No at S214), the input manner identification unit 122 determines that the user is about to perform input using the hand/finger and determines the input manner to be the 3D recognition (S216). Alternatively, the input manner identification unit 122 can also determine whether the user moves the input device 200 and starts to use it depending on whether the IMU sensor of the input device 200 has detected movement (S214).

When a plurality of users use the input device 200, the computer is caused to hold a use status of the input device 200. FIG. 9 is a diagram of exemplary data indicating the use status of the input device 200. In the example illustrated in FIG. 9, Device_1 is connected to the computer via a network and is being used by a certain user. Device_2 is connected to the computer via the network but is not being used by any user. In this situation, when determining that a certain user has approached the screen based on the sensing data by the overhead sensor 320, another user is about to perform input with Device_2, and thus the input manner identification unit 122 determines the input manner to be the 2D recognition.

Thus, the input manner by the user can be identified.

(1.2.2 Determination of Homing Sensor)

The following describes determination of the homing sensor 310 (S220). As described above, the homing sensor controller 131 determines the imaging position at which the input image is captured by the homing sensor 310 based on the positional relation between the input-related object (the screen or the operator, for example) and each of the imaging position candidates. In this process, the positional relation between the input-related object and each of the imaging position candidates may include the distance between the input-related object and each of the imaging position candidates. More specifically, the homing sensor 310 with a shorter distance may be more likely to be determined to be the homing sensor 310 capturing the input image. The positional relation between the input-related object and each of the imaging position candidates may include a direction of each of the imaging position candidates based on the input-related object. More specifically, an angle between a certain direction according to the input-related object and a direction of each of the imaging position candidates based on the input-related object may be included. When the input-related object is the screen, the certain direction may be a nominal direction of the screen. In this situation, the homing sensor 310 having a smaller angle between the nominal direction of the screen and the direction of the imaging position candidate based on the input-related object may be more likely to be determined to be the homing sensor 310 capturing the input image.

Alternatively, for the positional relation between the input-related object and each of the imaging position candidates, the size of the input-related object appearing in a captured image of each of the homing sensors 310 (the imaging device candidates) may be considered. That is to say, when the homing sensor 310 determines the homing sensor 310 capturing the input image based on the evaluation value related to the positional relation between the input-related object and each of the imaging position candidates, the evaluation value may include the size of the input-related object appearing in the captured image by each of the homing sensors 310. More specifically, the homing sensor 310 imaging the input-related object in a larger size may be more likely to be determined to be the homing sensor 310 capturing the input image.

Alternatively, for the positional relation between the input-related object and each of the imaging position candidates, a rotational angle of each of the homing sensors 310 may be considered. That is to say, when the homing sensor 310 determines the homing sensor 310 capturing the input image based on the evaluation value related to the positional relation between the input-related object and each of the imaging position candidates, the evaluation value may include the rotational angle of each of the homing sensors 310 required for the input-related object to be included in an imaging range. More specifically, the homing sensor 310 having a smaller rotational angle required for the input-related object to be included in the imaging range may be more likely to be determined to be the homing sensor 310 capturing the input image.

Alternatively, for the positional relation between the input-related object and each of the imaging position candidates, an area in which an obstacle or the user shields a captured image of each of the homing sensors 310 may be considered. That is to say, when the homing sensor 310 determines the homing sensor 310 capturing the input image based on the evaluation value related to the positional relation between the input-related object and each of the imaging position candidates, the evaluation value may include a shielded area size of the screen (the pointing surface) by the obstacle or the user appearing in the captured image of each of the homing sensors 310. More specifically, the homing sensor 310 having a smaller shielded area size of the captured image may be more likely to be determined to be the homing sensor 310 capturing the input image.

Alternatively, for the positional relation between the input-related object and each of the imaging position candidates, an area having a high possibility of not being used in the screen appearing in the captured image of each of the homing sensors 310 may be considered. That is to say, when the homing sensor 310 determines the homing sensor 310 capturing the input image based on the evaluation value related to the positional relation between the input-related object and each of the imaging position candidates, the evaluation value may include an area size in a certain direction based on the position of the user of the screen appearing in the captured image of each of the homing sensors 310. More specifically, the homing sensor 310 having a smaller area size in the certain direction based on the position of the user of the screen appearing in the captured image may be more likely to be determined to be the homing sensor 310 capturing the input image.

For the homing sensor 310 capturing the input image, information other than the positional information between the input-related object and each of the imaging position candidates may further be considered. For example, the homing sensor controller 131 may determine the imaging position based on the resolution of each of the homing sensors 310 in addition to the positional information between the input-related object and each of the imaging position candidates. More specifically, the homing sensor 310 having higher resolution may be more likely to be determined to be the homing sensor 310 capturing the input image.

The homing sensor controller 131 may determine the imaging position based on a detection result of external light by each of the homing sensors 310 in addition to the positional information between the input-related object and each of the imaging position candidates. More specifically, the homing sensor 310 having the smaller area size with a detection amount of the external light that is greater than a threshold may be more likely to be determined to be the homing sensor 310 capturing the input image.

The following mainly assumes a case in which the homing sensor controller 131 calculates an evaluation value indicating to what extent each of the homing sensors 310 is likely to be determined to be the homing sensor 310 capturing the input image as described above for each of a plurality of evaluation items. The following assumes a case in which the homing sensor controller 131 determines the imaging position based on a plurality of evaluation values and a weight coefficient of each of the evaluation values (the weight coefficient is determined based on the type of the operator, for example). However, the evaluation values are not necessarily used, and one evaluation value may be used. The weight coefficient is not particularly required to be used.

FIG. 10 is a flowchart of exemplary processing determining the homing sensor 310.

As illustrated in FIG. 10, the homing sensor controller 131 calculates an evaluation value indicating to what extent each of a plurality of homing sensor candidates is suitable for sensing (S221). In this process, the homing sensor controller 131 assigns weight to each of the evaluation items according to the input manner by the user (S222) and calculates a total evaluation value (S223). Finally, the homing sensor controller 131 determines a homing sensor having the largest total evaluation value (S224). The following describes the details of these pieces of processing.

FIG. 11 is a diagram of an exemplary evaluation value range and exemplary weight coefficients for each evaluation item. FIG. 12 to FIG. 20 are diagrams of specific examples of the evaluation item. The following describes the specific examples of the evaluation item with reference to FIG. 12 to FIG. 20.

<Distant to Screen (Dist)>

Figure 12:
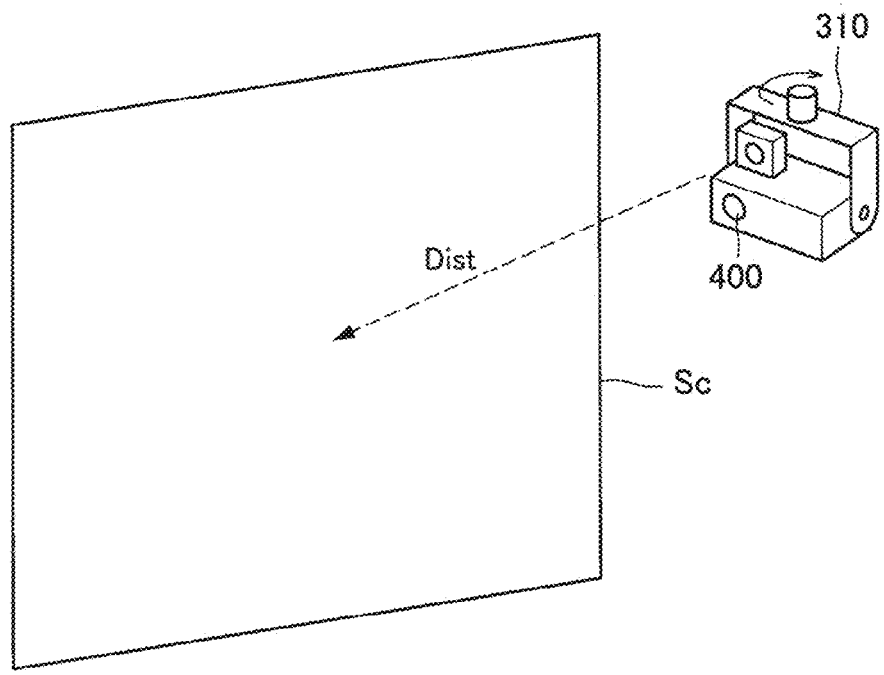
FIG. 12 is a diagram of a specific example of the evaluation item.

As illustrated in FIG. 12, the homing sensor controller 131 calculates a distance Dist between the homing sensor 310 and the screen Sc based on the position of the homing sensor 310 and the position of the screen Sc. A shorter distance to the screen Sc enables the homing sensor 310 to perform sensing with higher accuracy. For this reason, the homing sensor controller 131 calculates the evaluation value to be higher for the homing sensor 310 closer to the screen Sc.

In this process, the homing sensor controller 131, with MaxDist being a maximum distance from the homing sensor 310 to the screen Sc in an assumed environment and with MinDist being a minimum distance that can be sensed by the homing sensor 310 within a range of the characteristics of the homing sensor 310 and within a range in which the screen Sc is included in the view angle, calculates an evaluation value DistNorm, which is normalization of the calculated Dist with MaxDist and MinDist as shown in (Numerical Expression 1) below.

$$DistNorm = 1 - (Dist - MinDist)/(MaxDist - MinDist) \quad \text{(Numerical Expression 1)}$$

<Sensing Resolution to Screen (Resolution)>

Figure 13:
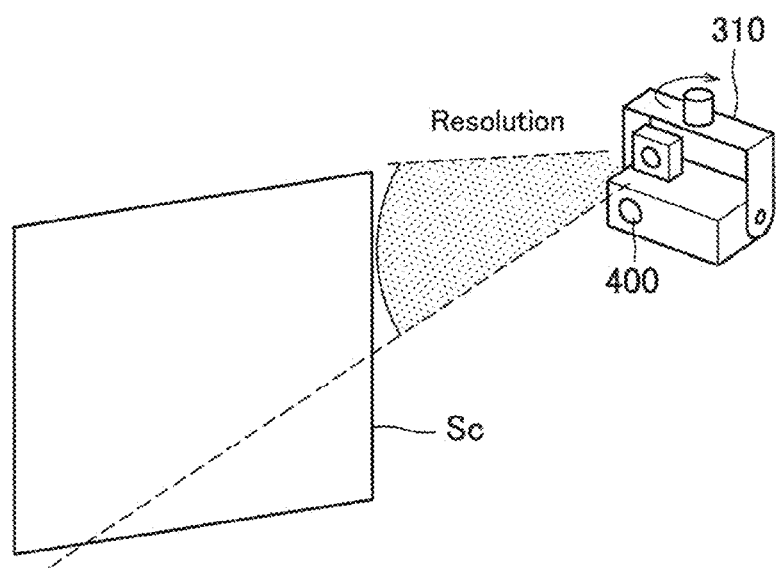
FIG. 13 is a diagram of a specific example of the evaluation item.

As illustrated in FIG. 13, the homing sensor controller 131 calculates a sensing accuracy Resolution of the screen Sc based on the resolution of the camera of the homing sensor 310 and an area that the screen Sc occupies in a sensor view angle. For example, when the lateral width of the screen Sc is ObjectSize (m) as an actual size and the lateral width of the screen Sc observed by the homing sensor 310 is ObjectPixel (pixel), the homing sensor controller 131 calculates an evaluation value Resolution as shown in (Numerical Expression 2) below.

$$Resolution = ObjectPixel/ObjectSize \quad \text{(Numerical Expression 2)}$$

The unit of Resolution is (pixel/m). That is to say, Resolution represents a pixel amount that can be sensed per 1 meter. Consequently, the homing sensor controller 131 can perform sensing with higher resolution with a larger Resolution and thus calculates the evaluation value to be higher. In this process, the homing sensor controller 131, with MaxResolution being the maximum resolution of the sensor and with the minimum resolution thereof being zero, calculates an evaluation value ResolutionNorm normalized as shown in (Numerical Expression 3) below.

ResolutionNorm=Resolution/MaxResolution (Numerical Expression 3)

<Sensing Distance Resolution to Screen (DepthResolution)>

Figure 14:
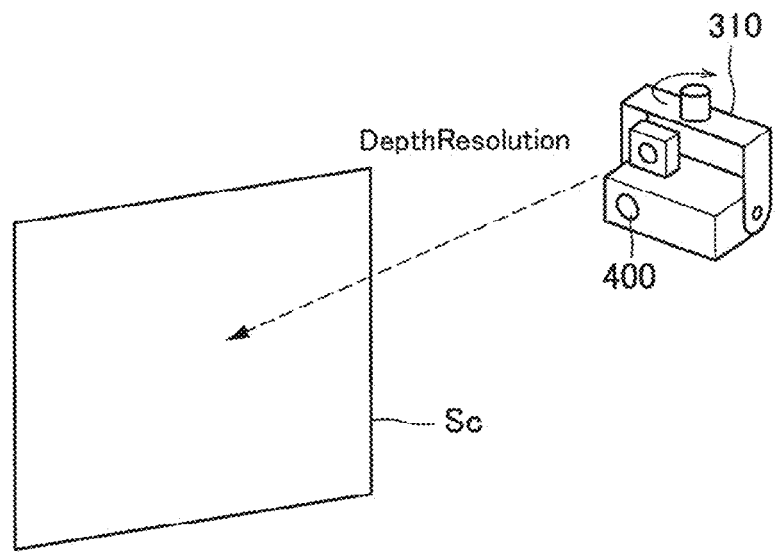
FIG. 14 is a diagram of a specific example of the evaluation items.

As illustrated in FIG. 14, the homing sensor controller 131 calculates a sensing distance resolution DepthResolution to the screen Sc based on the distance Dist to the screen Sc and the distance resolution of the depth sensor. This evaluation item can be used only in the case of the 3D recognition. The depth sensor produces higher resolution and depth value accuracy for a shorter distance to a subject and produces larger variations in resolution and depth value accuracy for a longer distance thereto. In some depth sensors, a depth value is not necessarily detected when the distance to the subject is shorter than a certain distance. The homing sensor controller 131, with MaxDepth being the maximum detection depth value of the depth sensor and with MinDepth being the minimum detection depth value thereof, calculates an evaluation value DepthResolutionNorm normalized as shown in (Numerical Expression 4) below.

DepthResolutionNorm=(DepthResolution−MinDepth)/(MaxDepth−MinDepth) (Numerical Expression 4)

<Angle between Screen and Sensor (Angle)>

Figure 15:
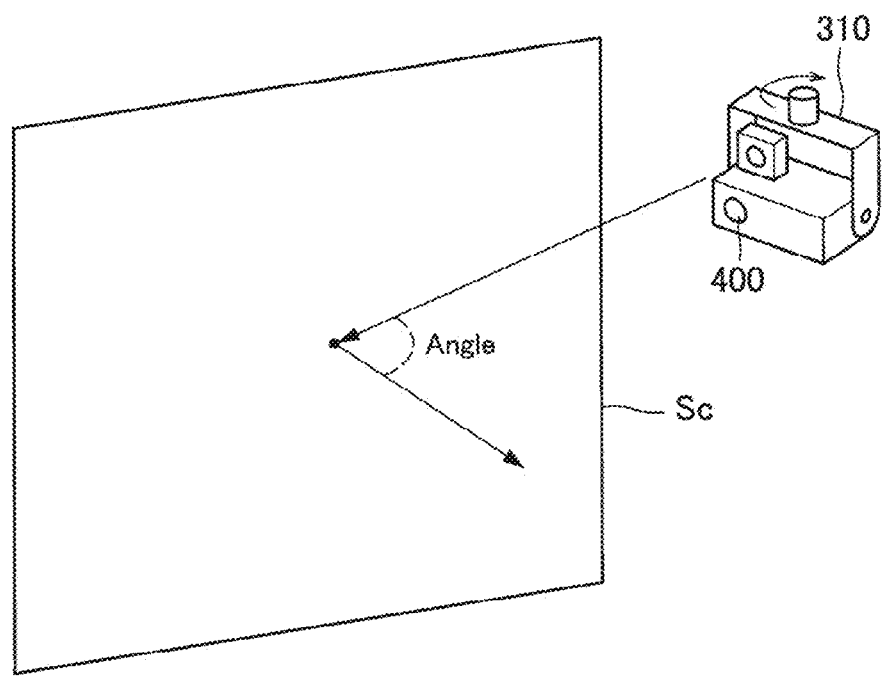
FIG. 15 is a diagram of a specific example of the evaluation item.

As illustrated in FIG. 15, the homing sensor controller 131 calculates an angle Angle between the nominal direction of the screen Sc and the direction of the homing sensor 310 when the homing sensor 310 is driven to face the screen Sc. It is assumed that a larger angle Angle gives larger observed strain of the screen Sc and lower detection accuracy. Given this, the homing sensor controller 131 calculates an evaluation value AngleNorm normalized by (Numerical Expression 5) below so as to give an evaluation value of 1 when the angle is 0° and an evaluation value of 0 when the angle is 180°.

AngleNorm=1−Angle/180 (Numerical Expression 5)

<Sensor Drive Angle to Screen (MovingAngle)>

Figure 16:
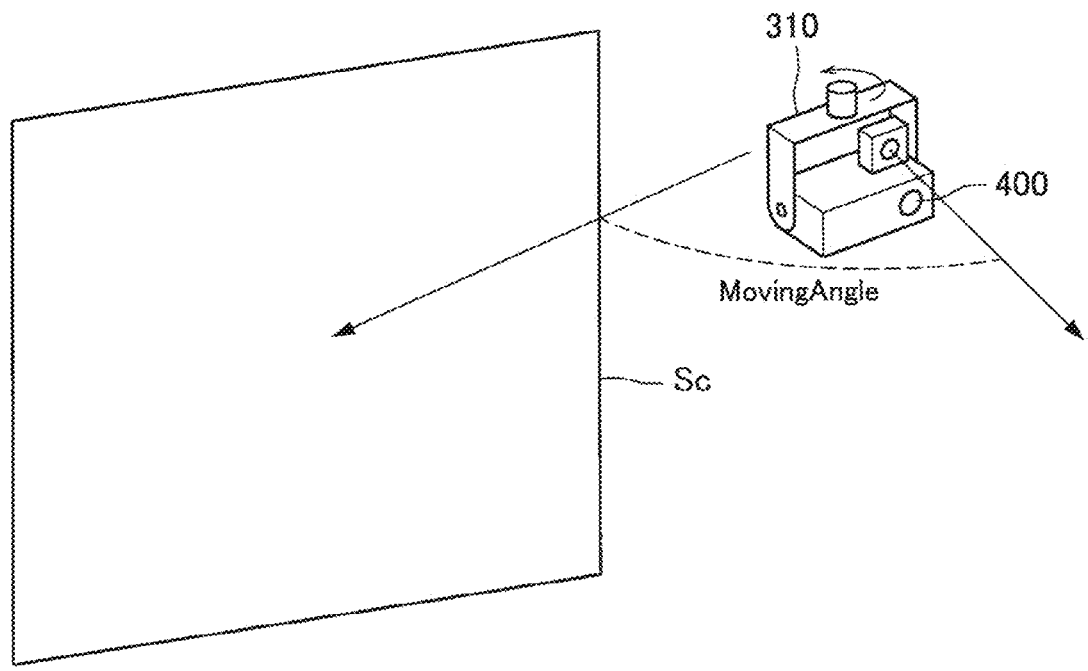
FIG. 16 is a diagram of a specific example of the evaluation item.

As illustrated in FIG. 16, the homing sensor controller 131 calculates a rotational angle (drive angle) MovingAngle of the homing sensor 310 from the current orientation of the homing sensor 310 until the homing sensor 310 faces the screen Sc. A larger rotational angle (drive angle) requires a longer drive time and thus requires a longer time for sensing the input by the user. Given this, the homing sensor controller 131 calculates the evaluation value to be higher for a smaller rotational angle (drive angle). In this process, calculated is an evaluation value MovingAngleNorm normalized by (Numerical Expression 6) below so as to give an evaluation value of 1 when the rotational angle (drive angle) is 0° and an evaluation value of 0 when the angle is 180°.

MovingAngleNorm=1−MovingAngle/180 (Numerical Expression 6)

<Shielded Area by Obstacle>

Figure 17:
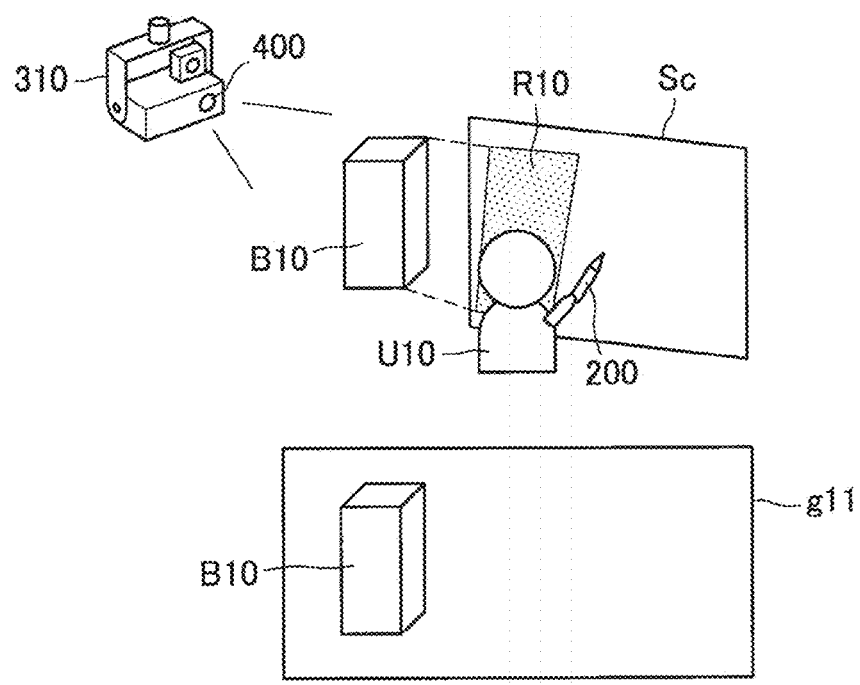
FIG. 17 is a diagram of a specific example of the evaluation item.

As illustrated in FIG. 17, the homing sensor controller 131 calculates a size ObjectOcclusion of a shielded area R10 by an obstacle B10 present between the homing sensor 310 and the screen Sc. More specifically, the homing sensor controller 131 can calculate the lateral width of an area in which an object (the obstacle B10) other than the screen Sc appears in a sensing view angle (that is, a captured image g11 captured by the overhead sensor 320) as the size ObjectOcclusion (in Pixel units) of the shielded area R10 by the obstacle B10.

<Shielded Area by User>

Figure 18:
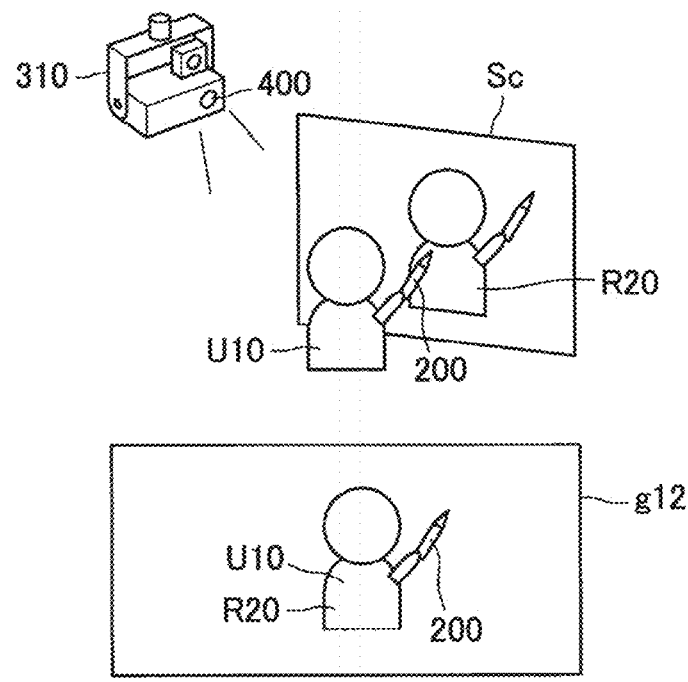
FIG. 18 is a diagram of a specific example of the evaluation item.

As illustrated in FIG. 18, the homing sensor controller 131 calculates a size HumanOcclusion of a shielded area R20 of the screen Sc by the user U10. More specifically, the homing sensor controller 131 can calculate the lateral width of an area in which the user appears in a sensing view angle (that is, a captured image g12 captured by the overhead sensor 320) as the size HumanOcclusion (in Pixel units) of the shielded area R20 by the user U10.

<Area Predicted not to be Used>

Figure 19:
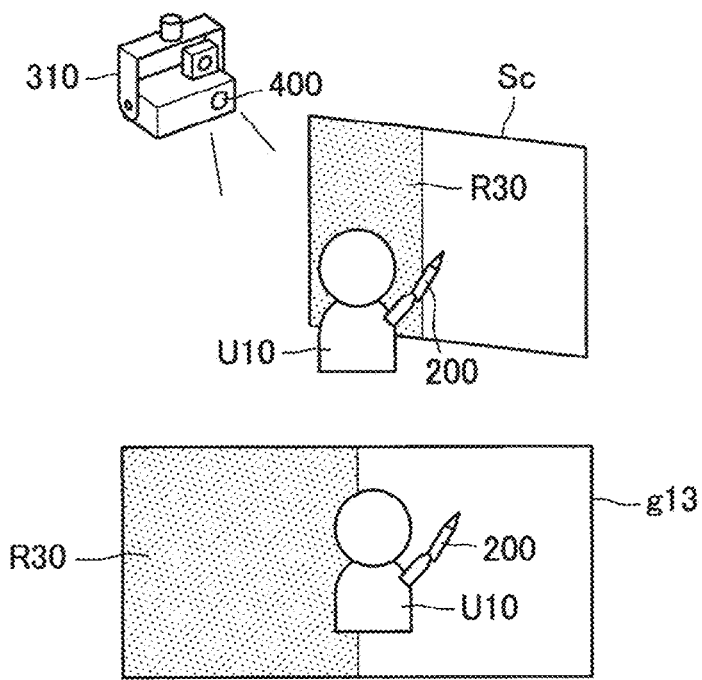
FIG. 19 is a diagram of a specific example of the evaluation item.

As illustrated in FIG. 19, the homing sensor controller 131 estimates an area HumanPredictOcclusion predicted not to be used when input is performed on the screen Sc by the user U10. In this process, the homing sensor controller 131 recognizes the dominant hand of the user U10. In the example illustrated in FIG. 19, the dominant hand of the user U10 is the right hand, and thus it is predicted that the input is mainly performed with the right hand as the dominant hand. In addition, the left hand is the hand opposite to the dominant hand, and thus it is predicted that the user does not perform input very much using the left hand. Given this, the homing sensor controller 131 predicts that the area opposite to the dominant hand of the user is an area not to be used.

For example, the homing sensor controller 131 can determine an area that can be sensed by the homing sensor 310 by capturing summation (OR) of the above three areas (the shielded area by the obstacle, the shielded area by the user, and the area predicted not to be used). In this process, the homing sensor controller 131 calculates an evaluation value OcclusionNorm, which is normalization of a sensor resolution SensorSize (pixel) by (Numerical Expression 7) below.

OcclusionNorm=1−(ObjectOcclusion||HumanOcclusion||HumanPredictOcclusion)/SensorSize (Numerical Expression 7)

<External Light>

Figure 20:
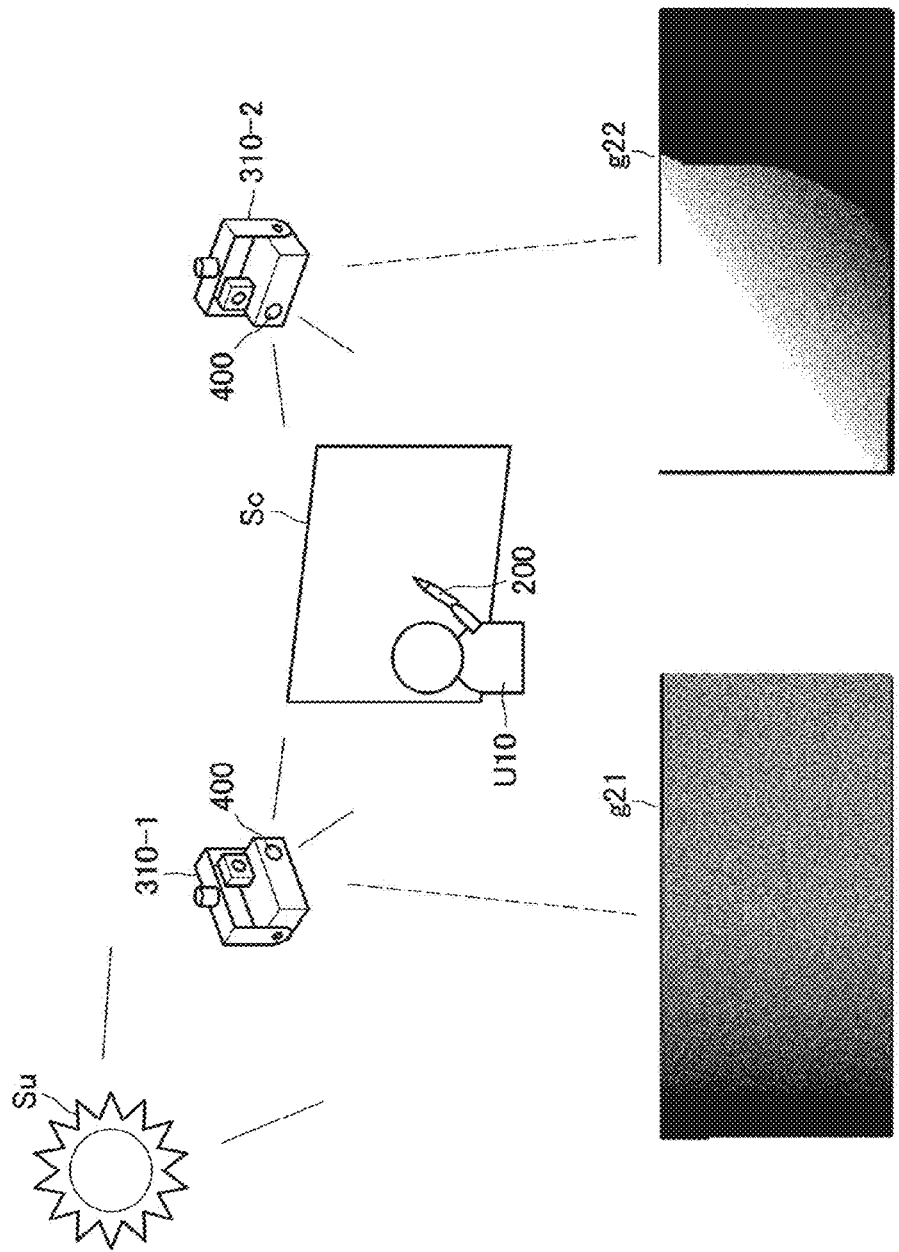
FIG. 20 is a diagram of a specific example of the evaluation item.

The homing sensor controller 131 evaluates the effect of external light on sensing. A case is assumed in which infrared light is sensed by the homing sensor 310 and where external light such as sunlight or halogen light has an effect on sensing accuracy. FIG. 20 illustrates an exemplary effect by the external light. In an infrared image g21 from the homing sensor 310-1, light from the sun Su is not directly observed. On the other hand, the homing sensor 310-2 performs observation in a direction in which the sun Su is positioned, and thus an infrared image g22 is made bright by sunlight.

In this process, the homing sensor controller 131 calculates an evaluation value based on the area of an area the infrared detection amount of which is greater than a threshold. For example, the homing sensor controller 131 calculates an evaluation value BrightAreaNorm, which is normalization of an area BrighterArea of the area the infrared detection amount of which is greater than a threshold by (Numerical Expression 8) below.

BrightAreaNorm=1−BrighterArea/SensorSize (Numerical Expression 8)

The area the infrared detection amount of which is greater than a threshold corresponds to an area in an image. For this reason, the evaluation value BrightAreaNorm can be calculated by further capturing summation (OR) of the area the infrared detection amount of which is greater than a threshold to the summation (OR) of the above three areas (the shielded area by the obstacle, the shielded area by the user, and the area predicted not to be used), that is, by 1−(ObjectOcclusion∥HumanOcclusion∥HumanPredictOcclusion∥BrighterArea)/SensorSize, which is a modification of (Numerical Expression 7).

The above mainly assumes a case in which the homing sensor 310 is provided at each of the imaging position candidates in advance. However, the homing sensor 310 is not necessarily provided at each of the imaging position candidates in advance. For example, when the homing sensor 310 is movable, the homing sensor controller 131 may move the homing sensor 310 to the determined imaging position. In this process, in the above, the evaluation value may be calculated with the position of the homing sensor 310 provided at each of the imaging position candidates replaced with the imaging position candidates to which the homing sensor 310 is movable.

For example, when the homing sensor 310 is movable, the homing sensor controller 131 may determine the imaging position based on a movement distance until the homing sensor 310 reaches each of the imaging position candidates in addition to the positional relation between the input-related object and each of the imaging position candidates. More specifically, an imaging position candidate being reached by the homing sensor 310 with a smaller movement distance may be more likely to be determined to be the imaging position. That is to say, the movement distance until the homing sensor 310 reaches each of the imaging position candidates can also be used as the evaluation value.

<Assignment of Weight to Evaluation Value by Input Manner>

In this process, the homing sensor controller 131 performs assignment of weight to the evaluation value by the input manner. Weight coefficients illustrated in FIG. 11 are provided, for example. When the sensing manner is the 3D recognition, distance, resolution, and the like are assumed to have a large effect on sensing. For this reason, the weight coefficient is preferably set to be larger than 1. The homing sensor controller 131 may regard values obtained by multiplying the above evaluation values by these weight coefficients as final evaluation values of the respective evaluation items.

<Calculation of Total Evaluation Value>

Finally, the homing sensor controller 131 calculates a total evaluation value. More specifically, the homing sensor controller 131 sums the final evaluation values of the respective evaluation items calculated by the above to calculate the total evaluation value. For example, the homing sensor controller 131 calculates the total evaluation value for each of the homing sensors 310 as candidates and uses the homing sensor 310 having the highest total evaluation value for sensing the input by the user.

(1.2.3. Drive of Homing Sensor)

The homing sensor controller 131 rotates (drives) the determined homing sensor 310 toward the screen Sc. The homing sensor controller 131 determines a three-dimensional positional relation between the screen Sc and the homing sensor by the depth sensor in advance. The homing sensor controller 131 calculates a rotational angle (drive angle) of the homing sensor 310 based on the three-dimensional positional relation and rotates (drives) the homing sensor 310 based on the rotational angle (drive angle). After completion of drive, the homing sensor 310 senses the input by the user, and the input controller 132 detects the input coordinates (the pointing coordinates).

The above example mainly describes a case in which after the input part is identified, the homing sensor 310 is determined, and then the homing sensor 310 is driven. However, the homing sensor controller 131 may follow an input status or input coordinates of a target, predict a next destination, and move the homing sensor 310 or cause another sensor to be directed based on a prediction result. The homing sensor controller 131 may direct a plurality of sensors to the same screen Sc to combine sensing results by the sensors to improve sensing accuracy.

When the determined homing sensor 310 is not rotated (driven) to the screen Sc, the homing sensor controller 131 may present a place to which the homing sensor 310 near the screen Sc can be driven (that is, the screen Sc that the homing sensor 310 near the screen Sc can face) to the user through an image or a voice.

(1.2.4. Detection of Input Coordinates)

The following finally describes detection of the input coordinates. The following describes detection of the input coordinates in each of a case in which the sensing manner is the 2D recognition and a case in which the sensing manner is the 3D recognition.

<Input by 2D Recognition>

Figure 21:
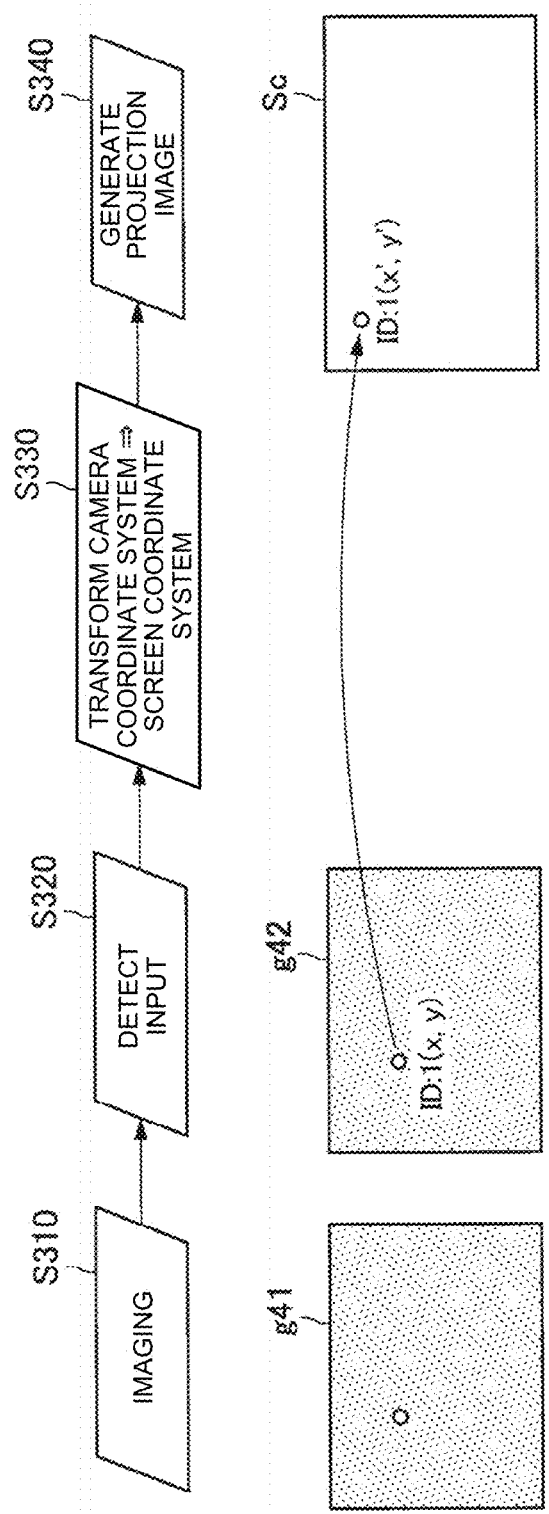
FIG. 21 is a diagram for illustrating detection of input coordinates when a sensing manner is 2D recognition.

FIG. 21 is a diagram for illustrating detection of the input coordinates in the case in which the sensing manner is the 2D recognition. As illustrated in FIG. 21, when an input image g41 is captured by the camera of the homing sensor 310 (S310), and input coordinates (x, y) are detected from an input image g42 (S320), the input controller 132 multiplies the input coordinates (x, y) by a two-dimension-to-two dimension projective transformation matrix (a Homography matrix) and can thereby transform the input coordinates (x, y) from a camera coordinate system to a screen coordinate system projected by a projector (S330). Subsequently, the input controller 132 generates a projection image (the first image) based on input coordinates (x', y') in the screen coordinate system. (S340)

As to the Homography matrix, the following site may be referred to, for example:
http://shogo82148.github.io/homepage/memo/geometry/homography/

<Input by 3D Recognition>

Figure 22:
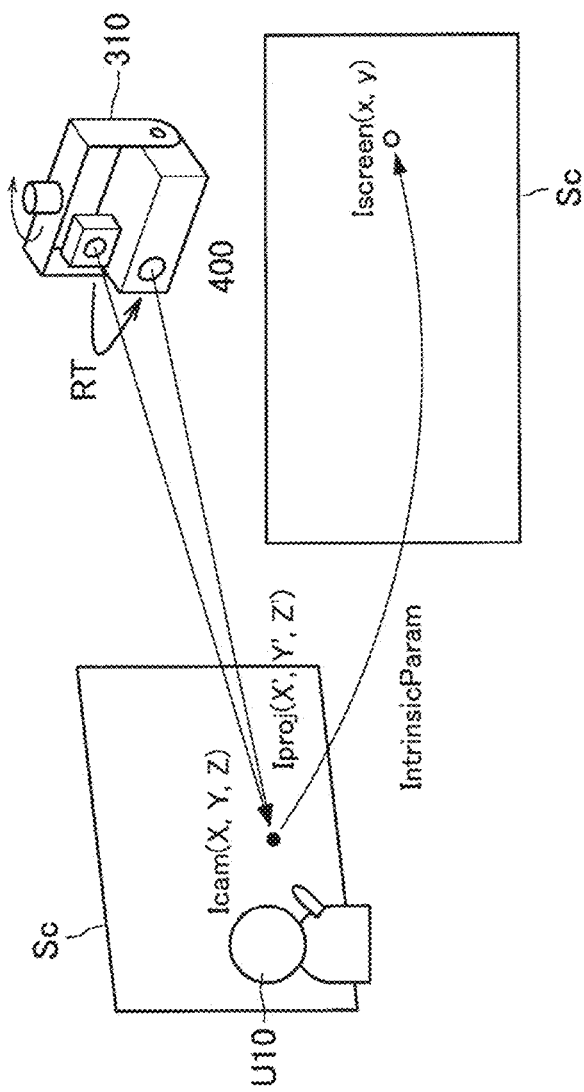
FIG. 22 is a diagram for illustrating detection of the input coordinates when the sending manner is 3D recognition.

FIG. 22 is a diagram for illustrating detection of the input coordinates in the case in which the sending manner is the 3D recognition. As illustrated in FIG. 22, the input controller 132 acquires a three-dimensional position Icam (X, Y, Z) detected from the depth information of the screen Sc and the hand/finger of the user U10 obtained by the depth sensor. The input controller 132 transforms the three-dimensional position Icam (X, Y, Z) obtained in the camera coordinate system into a projector coordinate system. More specifically, the input controller 132 multiplies Icam (X, Y, Z) by an external parameter (RT) representing a matrix of rotation and translation from the position of the camera (the homing sensor 310) to the projector 420 to perform Iproj (X', Y', Z') transformation. Next, the input controller 132 multiplies the three-dimensional position Iproj (X', Y', Z') after transformation by an internal parameter (IntrinsicParam) of the projector to perform coordinate transformation from the three-dimensional position Iproj (X', Y', Z') to input coordinates Iscreen (x', y') in a projector screen coordinate system. The input controller 132 generates a projection image based on the input coordinates Iscreen (x', y') in the projector screen coordinate system.

<Image Projection>

The input controller 132 performs display processing displaying the first image based on first pointing coordinates of the operator recognized from the input image as exemplary processing related to the input image captured by the camera of the homing sensor 310. The display processing may be executed by causing a projector to project the first image onto the screen (the pointing surface).

In this process, a possibility is assumed that a time at which the display processing displaying the first image is executed is delayed compared with a time at which the input by the user is started. As a measure against such a delay, the input controller 132 may display a second image based on second pointing coordinates of the operator recognized from the captured image of the overhead sensor 320 before the display processing displays the first image.

(1.2.5. End of User Input)

The following describes a condition for the end of the input. When the user is performing the input with the input device, the input controller 132 may end the input (the processing related to the input image) when the connection between the input device and the computer is cut, when the user explicitly turns off the power of the input device (when power supply to the input device ends), or when movement is not detected for a certain time or longer from the IMU sensor.

When the input with the hand/finger or the input device is being performed, the input controller 132 may recognize the position of the user at the same time with the recognition of the input coordinates and end the input (the processing related to the input image) when the user is no longer imaged by the homing sensor 310 (when it is detected that the user is no longer in the sensing range of the homing sensor 310). Alternatively, the input controller 132 may end the input (the processing related to the input image) when a first time has elapsed after the operator no longer indicates the screen (the pointing surface) (when the user does not perform the input for a certain time or longer). Alternatively, the input controller 132 may input the input (the processing related to the input image) when a second time has elapsed after movement of the operator is no longer detected.

[1.3. Exemplary Development Examples]

The following describes cases to which the present technique can be applied.

<Application Examples of Use Environment>

Figure 23:
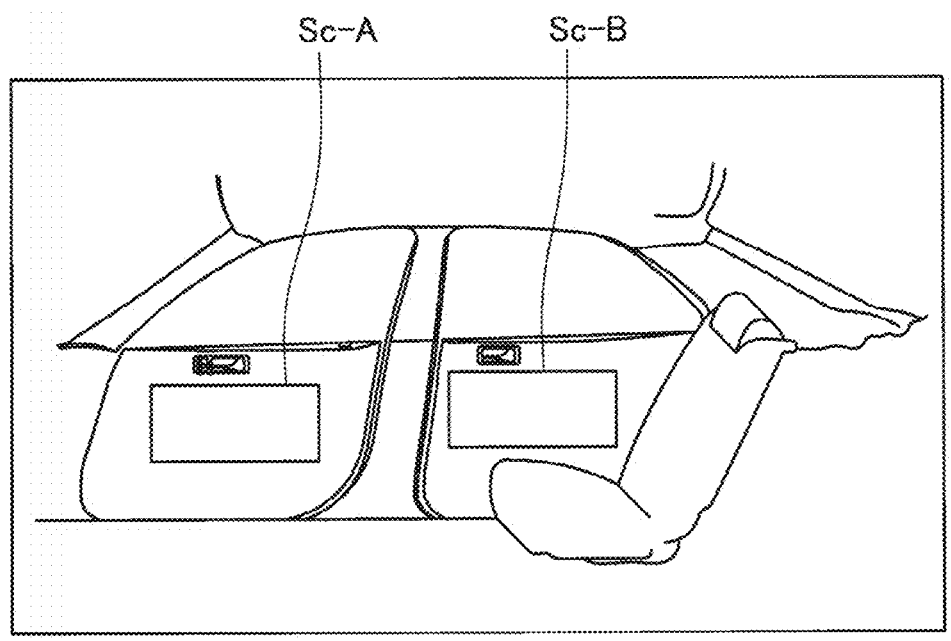
FIG. 23 is a diagram for illustrating a first application example of a use environment.

FIG. 23 is a diagram for illustrating a first application example of a use environment. The above assumes use of the system in an indoor environment. However, as illustrated in FIG. 23, a similar system may be constructed in an in-vehicle environment. An overhead sensor, a homing sensor, and a display device are provided in the in-vehicle environment, whereby input can be performed at any place in the vehicle in like manner with the indoor environment. In the future, in-vehicle content experience will probably substantially change owing to self-driving. The system according to the embodiment of the present disclosure is constructed, whereby a user input system can be introduced.

Figure 24:
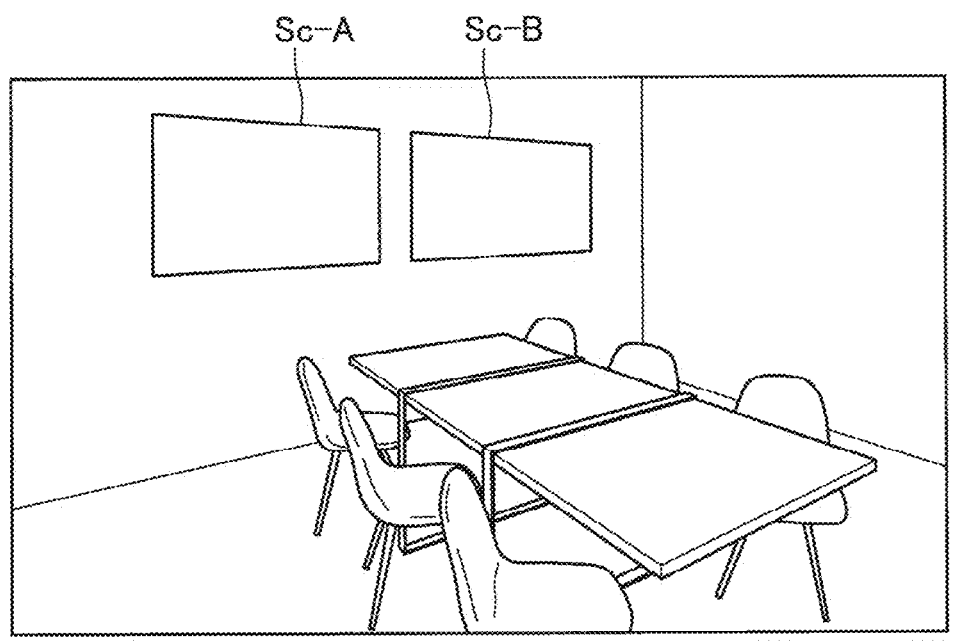
FIG. 24 is a diagram for illustrating a second application example of the use environment.
Figure 25:
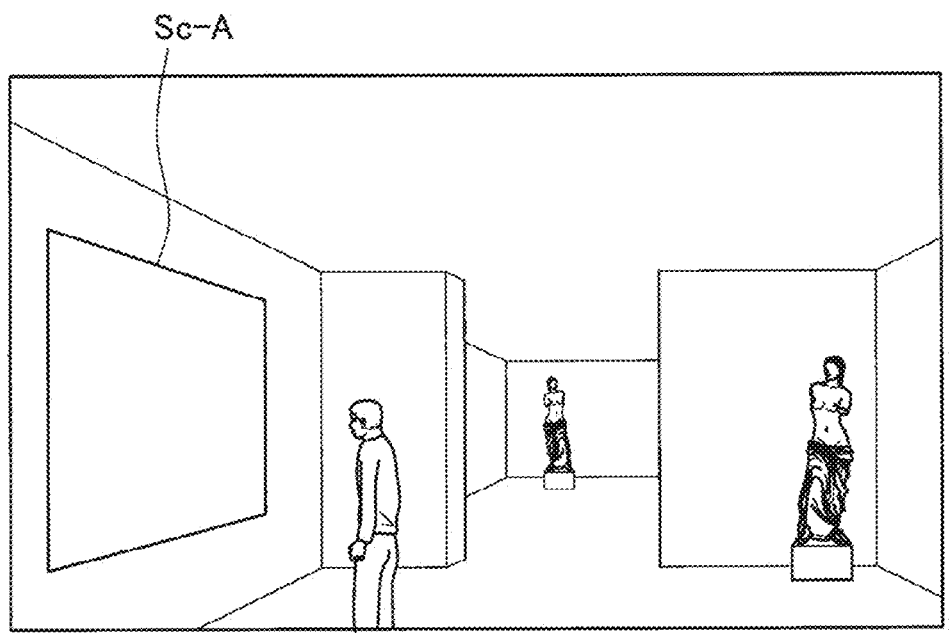
FIG. 25 is a diagram for illustrating a third application example of the use environment.

FIG. 24 is a diagram for illustrating a second application example of the use environment. As illustrated in FIG. 24, a similar system can also be constructed in a conference room environment. Using such a pen type input device as described above, input can be performed to any place of a conference room. FIG. 25 is a diagram for illustrating a third application example of the use environment. As illustrated in FIG. 25, the system according to the embodiment of the present disclosure can also be applied to indoor entertainment. In like manner with the conference room environment, using the pen type input device, experience enabling picture drawing to any place in the conference room can be constructed.

<Application Example of System>

The system according to the embodiment of the present disclosure mainly assumes a case in which it is used in one indoor environment. However, a plurality of systems constructed in different indoor environments may perform network communication. With this communication, input to a remote place can be performed, and applications such as communication with and work assistance for the remote place can be constructed. A similar application can also be possible in the above case in which picture drawing is performed.

[1.4. Exemplary Hardware Configuration]

Figure 26:
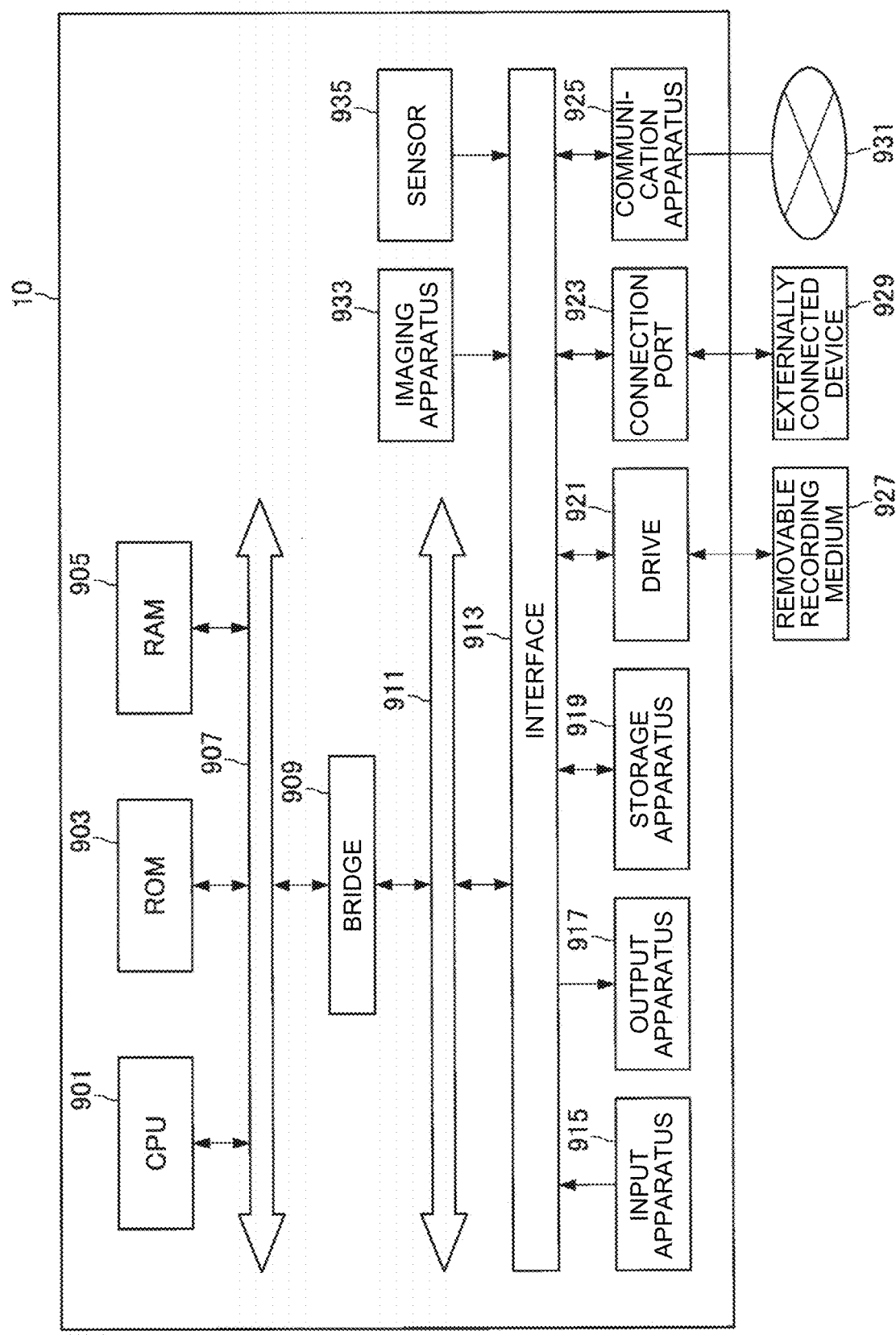
FIG. 26 is a block diagram of an exemplary hardware configuration of an information processing apparatus according to the embodiment of the present disclosure.

The following describes a hardware configuration of the information processing apparatus 100 according to the embodiment of the present disclosure with reference to FIG. 26. FIG. 26 is a block diagram of an exemplary hardware configuration of the information processing apparatus 100 according to the embodiment of the present disclosure.

As illustrated in FIG. 26, the information processing apparatus 100 includes a central processing unit (CPU) 801, a read only memory (ROM) 803, and a random access memory (RAM) 805. The information processing apparatus 100 may include a host bus 807, a bridge 809, an external bus 811, an interface 813, a storage apparatus 819, a drive 821, a connection port 823, and a communication apparatus 825. The information processing apparatus 100 may have a processing circuit called a digital signal processor (DSP) or an application specific integrated circuit (ASIC) in place of or together with the CPU 801.

The CPU 801 functions as an arithmetic processing unit and a control unit and controls the entire operation or part thereof in the information processing apparatus 100 in accordance with various kinds of computer programs recorded in the ROM 803, the RAM 805, the storage apparatus 819, or a removable recording medium 827. The ROM 803 stores therein computer programs and arithmetic parameters used by the CPU 801. The RAM 805 temporarily stores therein computer programs used in the execution of the CPU 801, parameters changing as appropriate in the execution, and the like. The CPU 801, the ROM 803, and the RAM 805 are connected to each other with the host bus 807 formed by an internal bus such as a CPU bus. Further, the host bus 807 is connected to an external bus 811 such as a Peripheral Component Interconnect/Interface (PCI) bus via the bridge 809.

The storage apparatus 819 is an apparatus for data storage configured as an exemplary storage unit of the information processing apparatus 100. The storage apparatus 819 includes a magnetic storage device such as a hard disk drive (HDD), a semiconductor storage device, an optical storage device, or a magneto-optical storage device, for example. This storage apparatus 819 stores therein computer programs and various kinds of data executed by the CPU 801, various kinds of data externally acquired, and the like.

The drive 821 is a reader/writer for the removable recording medium 827 such as a magnetic disc, an optical disc, a magneto-optical disc, or a semiconductor memory and is incorporated in or externally mounted on the information processing apparatus 100. The drive 821 reads information recorded in the removable recording medium 827 installed therein and outputs the information to the RAM 805. The drive 821 writes recording onto the removable recording medium 827 installed therein.

The connection port 823 is a port for directly connecting devices to the information processing apparatus 100. The connection port 823 can be a Universal Serial Bus (USB) port, an IEEE1394 port, or a Small Computer System Interface (SCSI) port, for example. The connection port 823 may be an RS-232C port, an optical audio terminal, a High-Definition Multimedia Interface (HDMI (registered trademark)) port, or the like. An externally connected device 829 is connected to the connection port 823 to enable various kinds of data to be exchanged between the information processing apparatus 100 and the externally connected device 829.

The communication apparatus 825 is a communication interface including a communication device for connecting to a network 931, for example. The communication apparatus 825 can be a communication card for wired or wireless Local Area Network (LAN), Bluetooth (registered trademark), or Wireless USB (WUSB), for example. The communication apparatus 825 may be a router for optical communication, a router for Asymmetric Digital Subscriber Line (ADSL), a modem for various kinds of communications, or the like. The communication apparatus 825 transmits and receives signals or the like to and from the Internet or other communication devices using a certain protocol such as TCP/IP, for example. The network 931 connected to the communication apparatus 825 is a network connected in a wired or wireless manner and is the Internet, home LAN, infrared communication, radio wave communication, or satellite communication, for example.

2. CONCLUSION

As described in the foregoing, the embodiment of the present disclosure provides an information processing apparatus including a determination unit that determines an input state of a user based on a captured image of a first imaging device and a sensor controller that determines an imaging position at which an input image is captured by a second imaging device different from the first imaging device, based on a positional relation between an input-related object related to input by the user and each of a plurality of imaging position candidates and the input state. According to the configuration, a technique by which an object related to input is sensed with higher accuracy is provided.

Thus, the preferred embodiment of the present disclosure has been described in detail with reference to the accompanying drawings; the technical scope of the present disclosure is not limited to the example. It is clear that those having ordinary skills in the technical field of the present disclosure can think of various kinds of modifications and revisions within the scope of the technical thought described in the claims, and it is understood that these also naturally belong to the technical scope of the present disclosure.

The effect described in the present specification is only illustrative or by way of example and is not restrictive. That is to say, the technique according to the present disclosure can produce other effects obvious to those skilled in the art from the description of the present specification together with the above effect or in place of the above effect.

The following configurations also belong to the technical scope of the present disclosure.

(1)

An information processing apparatus comprising:
a determination unit that determines an input state of a user based on a captured image of a first imaging device; and
a sensor controller that determines an imaging position at which an input image is captured by a second imaging device different from the first imaging device, based on a positional relation between an input-related object related to input by the user and each of a plurality of imaging position candidates and the input state.

(2)

The information processing apparatus according to (1), wherein the positional relation includes a distance between the input-related object and each of the imaging position candidates or a direction of each of the imaging position candidates based on the input-related object.

(3)

The information processing apparatus according to (1) or (2), wherein the second imaging device is narrower than the first imaging device in a view angle or is higher than the first imaging device in resolution.

(4)

The information processing apparatus according to any one of (1) to (3), wherein
the first imaging device is an overhead sensor, and
the second imaging device is a homing sensor.

(5)

The information processing apparatus according to any one of (1) to (4), wherein the input-related object includes at least either an operator or a pointing surface.

(6)

The information processing apparatus according to (5), wherein the information processing apparatus comprises an input controller that performs processing related to the input image.

(7)

The information processing apparatus according to (6), wherein the processing related to the input image is started by indication of the pointing surface with the operator.

(8)

The information processing apparatus according to (6) or (7), wherein the processing related to the input image ends when a first time has elapsed after the operator no longer indicates the pointing surface, when the second imaging device no longer images the user, when a second time has elapsed after movement of the operator is no longer detected, when connection between an input device and a computer is cut, or when power supply to the input device ends.

(9)

The information processing apparatus according to any one of (6) to (8), wherein the input state includes at least either a state in which the operator indicates the pointing surface or a state in which a distance between the user and the pointing surface is shorter than a certain distance.

(10)

The information processing apparatus according to any one of (6) to (8), wherein the processing related to the input image includes display processing displaying a first image based on first pointing coordinates of the operator recognized from the input image.

(11)

The information processing apparatus according to (10), wherein the input controller displays a second image based on second pointing coordinates of the operator recognized from the captured image of the first imaging device before the display processing.

(12)

The information processing apparatus according to (10) or (11), wherein the display processing is executed by causing a projector to project the first image onto the pointing surface.

(13)

The information processing apparatus according to any one of (6) to (12), wherein
the sensor controller determines the imaging position based on a plurality of evaluation values including an evaluation value according to the positional relation and a weight coefficient of each of the evaluation values, and the weight coefficient is determined based on a type of the operator.

(14)

The information processing apparatus according to any one of (6) to (13), wherein the sensor controller, based on a positional relation between the input-related object and an imaging device candidate provided at each of the imaging position candidates and the input state, selects the second imaging device from a plurality of the imaging device candidates to determine a position at which the second imaging device is provided to be the imaging position.

(15)

The information processing apparatus according to (14), wherein the sensor controller determines the imaging position based on an evaluation value related to the positional relation and the input state, and the evaluation value includes a size of the input-related object appearing in a captured image by each of the imaging device candidates, a rotational angle of each of the imaging device candidates required for the input-related object to be included in an imaging range, a shielded area size of the pointing surface by an obstacle or the user appearing in the captured image, or an area size in a certain direction based on a position of the user of the pointing surface appearing in the captured image.

(16)

The information processing apparatus according to (14) or (15), wherein the sensor controller determines the imaging position based on resolution of each of the imaging device candidates or a detection result of external light by each of the imaging device candidates, the positional relation, and the input state.

(17)

The information processing apparatus according to any one of (1) to (13), wherein the sensor controller moves the second imaging device to the determined imaging position.

(18)

The information processing apparatus according to (17), wherein the sensor controller determines the imaging position based on a movement distance until the second imaging device reaches each of the imaging position candidates, the positional relation, and the input state.

(19)

A method of information processing comprising:

determining an input state of a user based on a captured image of a first imaging device; and determining, by a processor, an imaging position at which an input image is captured by a second imaging device different from the first imaging device, based on a positional relation between an input-related object related to input by the user and each of a plurality of imaging position candidates and the input state.

(20)

An information processing system comprising:

a first imaging device; and an information processing apparatus, wherein the first imaging device captures a captured image, and the information processing apparatus comprises:

a determination unit that determines an input state of a user based on the captured image; and a sensor controller that determines an imaging position at which an input image is captured by a second imaging device different from the first imaging device, based on a positional relation between an input-related object related to input by the user and each of a plurality of imaging position candidates and the input state.

REFERENCE SIGNS LIST

1 Information processing system
100 Information processing apparatus
110 I/F unit
121 Environment recognition unit
122 Input manner identification unit
123 User recognition unit
124 Input accuracy analysis unit
125 Gesture recognition unit
126 Input device recognition unit
131 Homing sensor controller
132 Input controller
200 Input device
210 LED
220 Geomagnetism sensor
230 Acceleration sensor
240 Communication module
250 Retroreflective marker
260 Gyro sensor
310 Homing sensor
310 Homing
311 Drive mechanism
312 Camera
313 Depth sensor
314 Radar range finding sensor
320 Overhead sensor
321 Camera
322 Depth sensor
323 Thermo sensor
324 Radar range finding sensor
330 Homing sensor
400 Output device
410 Drive mechanism
420 Projector
430 Display

The invention claimed is:

1. An information processing apparatus, comprising:
a determination unit configured to determine an input state of a user based on a captured image of a first imaging device, wherein the input state includes at least one of a state in which an operator indicates a pointing surface or a state in which a distance between the user and the pointing surface is shorter than a threshold distance; and
a sensor controller configured to determine an imaging position, from a plurality of imaging position candidates, at which an input image is captured by a second imaging device different from the first imaging device, wherein
the determination of the imaging position is based on the input state and a positional relation between an input-related object and each of the plurality of imaging position candidates, and
the input-related object includes at least one of the operator or the pointing surface.

2. The information processing apparatus according to claim 1, wherein the positional relation includes at least one of a distance between the input-related object and each of the plurality of imaging position candidates or a direction of each of the plurality of imaging position candidates based on the input-related object.

3. The information processing apparatus according to claim 1, wherein at least one of a view angle of the second imaging device is narrower than a view angle of the first imaging device or a resolution of the second imaging device is higher than a resolution of the first imaging device.

4. The information processing apparatus according to claim 1, wherein
the first imaging device is an overhead sensor, and
the second imaging device is a homing sensor.

5. The information processing apparatus according to claim 1, further comprising an input controller configured to execute a process related to the input image.

6. The information processing apparatus according to claim 5, wherein the process related to the input image is started by indication of the pointing surface with the operator.

7. The information processing apparatus according to claim 5, wherein the process related to the input image ends in a case where at least one of a first time has elapsed after the operator no longer indicates the pointing surface, the second imaging device no longer images the user, a second time has elapsed after movement of the operator is no longer detected, connection between an input device and a computer is cut, or power supply to the input device ends.

8. The information processing apparatus according to claim 5, wherein the process related to the input image includes display of a first image based on first pointing coordinates of the operator recognized from the input image.

9. The information processing apparatus according to claim 8, wherein the input controller is further configured to display a second image, based on second pointing coordinates of the operator recognized from the captured image of the first imaging device prior to the display of the first image.

10. The information processing apparatus according to claim 8, wherein the input controller is further configured to display the first image by control of a projector to project the first image onto the pointing surface.

11. The information processing apparatus according to claim 5, wherein
the sensor controller is further configured to determine the imaging position based on a plurality of evaluation values and a weight coefficient of each of the plurality of evaluation values,
the plurality of evaluation values includes an evaluation value based on the positional relation, and
the weight coefficient is based on a type of the operator.

12. The information processing apparatus according to claim 5, wherein the sensor controller is further configured to:
select, based on the input state and a positional relation between the input-related object and an imaging device candidate provided at each of the plurality of imaging position candidates, the second imaging device from a plurality of imaging device candidates; and
determine, as the imaging position, a position at which the selected second imaging device is provided.

13. The information processing apparatus according to claim 12, wherein the sensor controller is further configured to determine the imaging position, based on the input state and an evaluation value related to the positional relation between the input-related object and the imaging device candidate, and
the evaluation value includes one of:
a size of the input-related object appearing in a captured image by each of the plurality of imaging device candidates,
a rotational angle of each of the plurality of imaging device candidates required for the input-related object to be included in an imaging range,
a shielded area size of the pointing surface by at least one of an obstacle or the user appearing in the captured image by each of the plurality of imaging device candidates, or
an area size in a certain direction based on a position of the user of the pointing surface appearing in the captured image by each of the plurality of imaging device candidates.

14. The information processing apparatus according to claim 12, wherein the sensor controller is further configured to determine the imaging position based on at least one of a resolution of each of the plurality of imaging device candidates or a detection result of external light by each of the plurality of imaging device candidates.

15. The information processing apparatus according to claim 1, wherein the sensor controller is further configured to move the second imaging device to the determined imaging position.

16. The information processing apparatus according to claim 15, wherein the sensor controller is further configured to determine the imaging position based on a movement distance until the second imaging device reaches each of the plurality of imaging position candidates.

17. A method of information processing, comprising:
determining, by a processor, an input state of a user based on a captured image of a first imaging device, wherein the input state includes at least one of a state in which an operator indicates a pointing surface or a state in which a distance between the user and the pointing surface is shorter than a threshold distance; and
determining, by the processor, an imaging position, from a plurality of imaging position candidates, at which an input image is captured by a second imaging device different from the first imaging device, wherein
the determination of the imaging position is based on the input state and a positional relation between an input-related object and each of the plurality of imaging position candidates, and
the input-related object includes at least one of the operator or the pointing surface.

18. An information processing system, comprising:
a first imaging device configured to capture an image; and
an information processing apparatus that comprises:
a determination unit configured to determine an input state of a user based on the captured image, wherein the input state includes at least one of a state in which an operator indicates a pointing surface or a state in which a distance between the user and the pointing surface is shorter than a threshold distance; and
a sensor controller configured to determine an imaging position, from a plurality of imaging position candidates, at which an input image is captured by a second imaging device different from the first imaging device, wherein
the determination of the imaging position is based on the input state and a positional relation between an input-related object and each of the plurality of imaging position candidates, and
the input-related object includes at least one of the operator or the pointing surface.

* * * * *